025B2" />

(12) United States Patent
Faynot et al.

(10) Patent No.: US 12,012,352 B2
(45) Date of Patent: Jun. 18, 2024

(54) MAT AND GYPSUM BOARDS SUITABLE FOR WET OR HUMID AREAS

(71) Applicant: Ahlstrom Oyj, Helsinki (FI)

(72) Inventors: Emmanuel Faynot, Vif (FR); Marc Berlioz, Froges (FR); Samuel Merlet, Vaulnaveys-le-Haut (FR); Claude Leclercq, Pernes les Fontaines (FR)

(73) Assignee: AHLSTROM OYJ, Helsinki (FI)

( * ) Notice: Subject to any disclaimer, the term of this patent is extended or adjusted under 35 U.S.C. 154(b) by 234 days.

(21) Appl. No.: 15/517,205

(22) PCT Filed: Oct. 6, 2015

(86) PCT No.: PCT/EP2015/073067
§ 371 (c)(1),
(2) Date: Apr. 6, 2017

(87) PCT Pub. No.: WO2016/055489
PCT Pub. Date: Apr. 14, 2016

(65) Prior Publication Data
US 2017/0305783 A1    Oct. 26, 2017

(30) Foreign Application Priority Data

Oct. 6, 2014 (EP) ..................................... 14290301
Nov. 21, 2014 (WO) ................. PCT/EP2014/075306

(51) Int. Cl.
| C03C 13/00 | (2006.01) |
| B32B 5/02 | (2006.01) |
| B32B 5/08 | (2006.01) |
| B32B 5/22 | (2006.01) |
| B32B 5/24 | (2006.01) |
| B32B 5/26 | (2006.01) |
| B32B 7/12 | (2006.01) |
| B32B 13/00 | (2006.01) |
| B32B 13/14 | (2006.01) |
| C03C 13/06 | (2006.01) |
| C04B 28/14 | (2006.01) |
| D04H 1/00 | (2006.01) |
| D04H 1/587 | (2012.01) |
| D04H 13/00 | (2006.01) |
| D21H 11/00 | (2006.01) |

(Continued)

(52) U.S. Cl.
CPC .............. *C03C 13/00* (2013.01); *B32B 5/022* (2013.01); *B32B 5/08* (2013.01); *B32B 5/22* (2013.01); *B32B 5/24* (2013.01); *B32B 5/26* (2013.01); *B32B 7/12* (2013.01); *B32B 13/00* (2013.01); *B32B 13/14* (2013.01); *C03C 13/06* (2013.01); *C04B 28/14* (2013.01); *D04H 1/00* (2013.01); *D04H 1/587* (2013.01); *D04H 13/00* (2013.01); *D21H 11/00* (2013.01); *D21H 11/12* (2013.01); *D21H 13/00* (2013.01); *D21H 13/14* (2013.01); *D21H 13/24* (2013.01); *D21H 13/26* (2013.01); *D21H 17/33* (2013.01); *D21H 17/37* (2013.01); *E04C 2/04* (2013.01); *E04C 2/043* (2013.01); *B32B 2260/021* (2013.01); *B32B 2260/046* (2013.01); *B32B 2262/0253* (2013.01); *B32B 2262/0261* (2013.01); *B32B 2262/0269* (2013.01); *B32B 2262/0276* (2013.01); *B32B 2262/04* (2013.01); *B32B 2262/06* (2013.01); *B32B 2262/062* (2013.01); *B32B 2262/065* (2013.01); *B32B 2262/067* (2013.01); *B32B 2262/10* (2013.01); *B32B 2262/101* (2013.01); *B32B 2262/14* (2013.01); *B32B 2307/538* (2013.01); *B32B 2307/546* (2013.01); *B32B 2307/718* (2013.01); *B32B 2419/00* (2013.01); *C03C 25/103* (2013.01); *C03C 25/28* (2013.01); *C04B 2111/0062* (2013.01); *C04B 2111/00629* (2013.01)

(58) Field of Classification Search
CPC .............. B32B 5/022; B32B 5/08; B32B 5/22
See application file for complete search history.

(56) References Cited

U.S. PATENT DOCUMENTS 3,766,002 A * 10/1973 Greif .......................... C08J 5/02
                                                                    162/146
4,047,355 A    9/1977 Knorr
(Continued)

FOREIGN PATENT DOCUMENTS

DE    19751553 A1 *  7/1999  ............ C08F 218/04
EP    0 731 207         9/1996
(Continued)

OTHER PUBLICATIONS

Bledzki—Microcellular injection molded wood fiber—wood fiber content—J.Cell.Plast—2006 (Year: 2006).*
(Continued)

*Primary Examiner* — John Vincent Lawler
(74) *Attorney, Agent, or Firm* — CANTOR COLBURN LLP

(57) ABSTRACT

The invention relates to a fibrous mat facer for preparing a gypsum board, to a gypsum board comprising said mat facer and to a system comprising said gypsum board. The fibrous mat comprises at least one ply of a non-woven fabric, and a binder composition, wherein the binder composition represents from 10 to 40 wt % of the total weight of the mat. The binder composition comprises a copolymer comprising a co-monomer unit of a vinyl ester of an alpha branched aliphatic monocarboxylic acid, said copolymer being present in an amount from 25 to 100 wt % of the binder composition weight.

33 Claims, No Drawings

(51) Int. Cl.

| | | |
|---|---|---|
| D21H 11/12 | (2006.01) | |
| D21H 13/00 | (2006.01) | |
| D21H 13/14 | (2006.01) | |
| D21H 13/24 | (2006.01) | |
| D21H 13/26 | (2006.01) | |
| D21H 17/33 | (2006.01) | |
| D21H 17/37 | (2006.01) | |
| E04C 2/04 | (2006.01) | |
| C03C 25/1025 | (2018.01) | |
| C03C 25/28 | (2018.01) | |
| C04B 111/00 | (2006.01) | |

(56) References Cited

U.S. PATENT DOCUMENTS

| | | | |
|---|---|---|---|
| 4,647,496 A | 3/1987 | Lehnert et al. | |
| 4,783,942 A | 11/1988 | Nunley et al. | |
| 4,837,271 A * | 6/1989 | Brindopke | C08K 5/0025 |
| | | | 525/330.3 |
| 5,319,900 A | 6/1994 | Lehnert et al. | |
| 5,326,820 A * | 7/1994 | Hoffmann | C08G 18/4063 |
| | | | 524/849 |
| 5,540,987 A * | 7/1996 | Mudge | C08F 18/08 |
| | | | 442/59 |
| 5,552,187 A | 9/1996 | Green et al. | |
| 5,708,117 A * | 1/1998 | Becker | C08G 18/0885 |
| | | | 427/402 |
| 5,763,022 A | 6/1998 | Lumpp et al. | |
| 5,977,244 A * | 11/1999 | Kohlhammer | D04H 1/435 |
| | | | 156/283 |
| 6,048,936 A * | 4/2000 | Epple | C08F 283/02 |
| | | | 525/10 |
| 6,174,568 B1 | 1/2001 | Kohlhammer et al. | |
| 6,787,486 B1 | 9/2004 | Gregg et al. | |
| 7,553,780 B2 * | 6/2009 | Smith | B32B 13/14 |
| | | | 442/131 |
| 2001/0034399 A1 | 10/2001 | Kohlhammer et al. | |
| 2002/0135086 A1 | 9/2002 | Hashemzadeh et al. | |
| 2003/0143414 A1* | 7/2003 | Bendix | C08G 18/0866 |
| | | | 428/500 |
| 2004/0209074 A1 | 10/2004 | Randall et al. | |
| 2004/0266303 A1 | 12/2004 | Jaffee | |
| 2005/0202742 A1 | 9/2005 | Smith et al. | |
| 2006/0068186 A1* | 3/2006 | Leclercq | B32B 5/022 |
| | | | 428/294.7 |
| 2008/0245012 A1* | 10/2008 | Boisvert | E04C 2/043 |
| | | | 428/312.4 |
| 2009/0156078 A1 | 6/2009 | Connaughton, I et al. | |
| 2010/0062264 A1* | 3/2010 | Hayes | C08F 218/10 |
| | | | 428/432 |
| 2010/0066121 A1 | 3/2010 | Gross | |
| 2011/0183075 A1* | 7/2011 | Hendrickx | C08F 265/00 |
| | | | 427/385.5 |
| 2012/0028783 A1 | 2/2012 | Van Boxtel et al. | |
| 2013/0295378 A1 | 11/2013 | Bonin et al. | |

FOREIGN PATENT DOCUMENTS

| | | | | |
|---|---|---|---|---|
| EP | 0731207 | * | 9/1996 | D06M 15/263 |
| EP | 1413668 A1 | * | 4/2004 | D06M 15/263 |
| EP | 1 980 540 | | 10/2008 | |
| EP | 2 230 075 | | 9/2010 | |
| EP | 2230075 A1 | * | 9/2010 | E04C 2/043 |
| RU | 2358875 | | 6/2009 | |
| RU | 2363822 | | 10/2009 | |
| WO | WO 94/12549 | | 6/1994 | |
| WO | WO 1994/14891 | * | 7/1994 | C08L 31/02 |
| WO | WO 99/42500 | | 8/1999 | |
| WO | WO1999/42500 | * | 8/1999 | C08F 18/10 |
| WO | WO 00/22016 | | 4/2000 | |
| WO | 0206605 A1 | | 1/2002 | |
| WO | WO 2004/055286 | | 7/2004 | |
| WO | 2008100777 A2 | | 8/2008 | |
| WO | WO 2010/026065 | | 3/2010 | |
| WO | 2013/113457 | | 8/2013 | |
| WO | 2013/113459 | | 8/2013 | |
| WO | WO-2013113459 A1 | * | 8/2013 | B32B 5/022 |

OTHER PUBLICATIONS

Arriaga—Branched Vinyl Ester Monomers—PCI Mag. w-figures—Dec. 1, 2013 (Year: 2013).*
Hexion—VeoVa 10 Monomer—Datasheet—Aug. 2016 (Year: 2016).*
Slinckx & Sholten—VeoVa 9-acrylate copolymers—Surface Coatins International—1994 (Year: 1994).*
Etmimi—Hydrophobic_coreshell_particles_via_miniemulsion—2006 (Year: 2006).*
Lumpp—EP 0731207 A1—MT—binder for textile—1996 (Year: 1996).*
Koehler—DE 19751553 A1—MT—crosslinked composition—1999 (Year: 1999).*
Hiemenz—EP 1413668 A1—MT—coating for textiles—2004 (Year: 2004).*
First Official Action, CN Appln No. 201580054397.5, dated Jul. 9, 2018.
European Search Report, Application No. EP 17203938, dated Feb. 5, 2018.
International Search Report for PCT/EP2015/073067, dated Jan. 8, 2016, 4 pages.
Written Opinion of the ISA for PCT/EP2015/073067, dated Jan. 8, 2016, 5 pages.
Search Report, RU Register No. 201711488/05 (025854) (dated Dec. 21, 2018).
Notice of Opposition issued in EP Appln. No. 15777673.3 dated Sep. 6, 2019.
Arkema, "Arkema Emulsion Systems—Polymer Selection Guide," 9 pages (2010).
Arkema, "Neocar Acrylic 820," Coating Resins Arkema, 1 page (accessed Aug. 6, 2019).
Arriaga et al., "Branched Vinyl Ester Monomers for Hydrophobic Emulsion Polymers" PCI Paint & Coatings Industry, Hexion Specialty Chemics, 9 pages, (Dec. 1, 2013).
Hexion, "Technical Data Sheet—VeoVa 9 Monomer", 2 pages, (revised Dec. 31, 2014).
Hexion, "Technical Data Sheet—VeoVa 10 Monomer", 2 pages, (revised Jan. 2015).
Scrimco, Inc., "What is Scrim?" (Aug. 1985).
Wikipedia, "Neodecanoic acid," 1 page, (last modified Nov. 15, 2018).
Yan et al., "Modification of Acrylic Emulsion Polymers with Vinyl Neodecanoate; Enhancing Performance and Providing a Route to Cost-Efficient Alternatives," 10 pages, Hexion, Inc.

* cited by examiner

MAT AND GYPSUM BOARDS SUITABLE FOR WET OR HUMID AREAS

This application is the U.S. national phase of International Application No. PCT/EP2015/073067 filed 6 Oct. 2015 which designated the U.S. and claims priority to EP Application No. 14290301.2 filed 6 Oct. 2014, and International Application No. PCT/EP2014/075306 filed 21 Nov. 2014, the entire contents of each of which are hereby incorporated by reference.

TECHNICAL FIELD OF THE INVENTION

The invention relates to a building material comprising a layer of gypsum plaster core sandwiched between two mats. In particular, the subject matter of the invention relates to a specific type of mat or facer, to a gypsum board comprising said facer and to a system comprising said board. This plasterboard is suitable for external and internal applications. It is particular suitable for being used as external sheathing and for building or renovation material in a bathroom, a kitchen, a laundry room, and in any room that may be exposed to humidity or even in outdoor applications.

BACKGROUND OF THE INVENTION

Gypsum boards, drywalls or plasterboards, usually comprise a gypsum core bonded to a woven or non-woven fabric of inorganic and/or organic fibres located on or just embedded below the surfaces. This fabric may be formed by single or multiple layers and may be reinforced by filaments or webs of fibre strands. The surfaces may vary according to the intended use. Although the core of a gypsum board mainly comprises gypsum material it may also comprise fibres, additives and/or fillers to impart additional properties. Gypsum boards with fabric reinforcement have usually a cellulosic paperboard or a nonwoven material wrapped around a thicker layer of gypsum. The gypsum is typically obtained from a hydratable calcium sulphate such as $CaSO_4 \cdot \frac{1}{2}H_2O$, which is hardened upon wetting and subsequent drying. The gypsum composition may include water resistant additives such as poly(vinyl alcohol), wax, polysiloxanes or thermoplastic synthetic resins. Other additives include the fire resistant glass fibres or mineral fillers, such as clay. Properties of the gypsum board can therefore be tuned according to the intended final use.

Water resistant additives, such as fluorocarbon resin or silicone derivatives are commonly introduced into the fabric to bring hydrophobicity to the final gypsum board. The water resistance of a gypsum board is typically characterized by the maximum allowed absorption of liquid water into the board, in accordance with applicable norms of each country, as for example the norm ASTM C-473 or EN-520 or EN 15 283-1.

Although the introduction of additives within the gypsum and/or the mat may be necessary in order to ensure that the gypsum board is suitable to be used in a wet area, it may also dramatically weaken the bonding between the mat and the gypsum and thus impairing its mechanical strength. Indeed, the addition of some additives, such as hydrophobic additives may prevent a good surface contact and chemical interaction between the fibrous mat and the gypsum core, thus resulting in loss of other desirable properties of the gypsum boards.

As a consequence, one of the main issues in developing gypsum boards for wet areas applications concerns the compatibility between the specific gypsum composition and the mat. Improvement of the bonding between the mat and the gypsum is therefore of high concern, whilst maintaining the other desirable properties of said boards such as mechanical resistance and a light weight.

Prior art examples of wet resistant gypsum board include mats that have been tailored to the gypsum composition. For instance, US 2006/0068186 describes a non-woven fabric comprising two plies of different compositions, an inner ply and an outer ply, where the inner ply is in contact with the gypsum core. The inner ply comprises a mixture of cellulose fibres, inorganic or mineral fibres and optionally organic fibres. On the other hand, the outer ply comprises essentially cellulose fibres. These 2 plies are bonded together with a binder and a mineral filler in the presence of a fluorocarbon water resistant agent. The inner and outer layers have respectively an inner and outer exterior face, where the inner exterior face comes in contact with the gypsum board. The inner and outer exterior faces are relatively flat as a result of the standard wet-laid nonwoven production process for forming the web. While the boards according to this prior art document are satisfactory, further improvement of the bonding remains desirable.

EP2230075 relates to a nonwoven mat for wet area gypsum board wherein at least one surface of the nonwoven mat is treated with a hydrophilic binder latex. In this gypsum board the bonding between the gypsum core and the mat is enhanced thanks to improved chemical compatibility.

WO2004055286 discloses a gypsum panel comprising a gypsum core faced with a fibrous mat. A thin coating of a curable formulation is applied on the fibrous facing sheet of the gypsum panel.

WO2008100777 discloses a gypsum panel which is covered on at least one face with a fibrous woven or non-woven mat. A finish material is applied on the surface of the mat which is in contact with the gypsum panel. The goal is to decrease the water permeability of the fibrous mat facing in order to improve the water resistance of the panel.

U.S. Pat. No. 6,787,486 discloses a backerboard sheet having moisture resistant face layers secured to an aerated concrete core. In a specific embodiment, moisture resistant face layers include a woven fibre mesh incorporated into a respective resin layer.

U.S. Pat. No. 7,932,195 discloses a pre-coated mat and a gypsum board comprising it, said mat having a thickness between 0.76-0.83 mm and being composed mainly by chopped non-woven fibreglass filaments of approximately 10-16 µm diameter oriented in a random pattern but with no cellulose based fibres. This mat is pre-coated with an aqueous coating composition containing a mineral pigment or filler and a binding mixture comprising a first organic binder such as a hydrophobic UV resistant polymer latex and a second inorganic adhesive binder in a manner that the coating solution penetrates the mat structure into a depth of about 30 to 50% of the total mat thickness. The combination of these features result in a bond strength between the gypsum core and the mat facer from 16 psi to 19 psi, respectively 0.11 MPa and 0.13 MPa, which is considered a rather low bonding strength with regards to adhesives used in associated systems. In ETAG 004 (European Technical Approval Guidance), a minimum level of 0.25 MPa is recommended for EIFS. Moreover, the resulting mat is also rather thick, which is a disadvantage for handling and transporting.

WO2013113459 discloses a gypsum board having enhanced bonding properties between the gypsum core and the mat as compared to above mentioned plasterboards mainly due to its surface roughness. This gypsum board may also comprise water resistant and/or water repellent agents in the core and/or in the mat, which makes it especially suitable to be used in humid or wet conditions. However, to achieve some of other desirable characteristics and properties, such as mechanical strength between the gypsum core and the mat, said gypsum board must have at least one side covered by a non-woven fabric having the inner side a surface roughness Ra of from 25 to 60 micrometres.

In order to address the above mentioned technical problems and despite the deficiencies related to the above solutions it is desirable to develop a mat facer for preparing a gypsum board that is suitable to be applicable to buildings and constructions in wet and/or humid conditions maintaining the other relevant properties associated to this kind of materials and to their intended use.

Therefore, the present invention relates to a mat facer for preparing a plasterboard that may be lighter and exhibit enhanced bonding properties between the gypsum core and the mat as compared to prior art plasterboards, whilst maintaining the other relevant properties, including a desirable mechanical strength allowing it to be used in external and internal applications in the building field in wet or humid areas.

SUMMARY OF THE INVENTION

The subject matter of the invention relates to a fibrous mat for preparing a gypsum board, to a gypsum board comprising said fibrous mat and to a system comprising said gypsum board.

In particular embodiments, the fibrous mat described herein can show an improved inner cohesion strength. It may also exhibit a lower grammage (mass per area, typically expressed in units of $g/m^2$), lower thickness, increased air porosity, higher tensile strength, and higher flexural strength on boards lined with the fibrous mat. It may have a certain lower surface roughness and an embossing pattern, which can ensure that the fibrous mat is tightly bound to the gypsum core regardless of the gypsum composition and/or the presence of additives but, and may allow for an easier handling and transportation.

Regarding the process of manufacture the facer, it can be produced by common processes but preferably by a wet-laid process. This may allow for the use of longer reels and hence less splicing operations between rolls that may cause losses and breaks in the production of gypsum boards. The drying step of gypsum boards may be performed faster due to the higher porosity of the material, which leads to energy savings. In a preferred embodiment, the non-woven material is impregnated with a binder solution that confers to the mat some of the improved properties mentioned above, in particular better inner cohesion, bonding strength, while keeping the other essential properties such as no penetration of cementitious slurry through the mat, and such as the hydrophobic surface characteristics (water absorption and water permeability). In addition, in a more preferred embodiment, the process of the present invention is free or substantially free of formaldehyde and fluorocarbon additives, which turns the resulting product, the facer of the present invention, into a more environmental friendly "green product" capable of obtaining a Class A+ certification (<10 µg/m³ formaldehyde—Indoor Air Quality). This is an important feature of the invention once it can be implemented and used under more restrictive environmental and/or health legal framework.

Further provided herein is a plasterboard, also referred as "gypsum board". The plasterboard described herein is a plasterboard comprising a fibrous mat as described above, and is particularly suitable to be used in wet or humid conditions. It may have a better mechanical resistance when compared with similar boards for wet and humid areas, while maintaining good water repellence features. It may also show an improved bonding strength between the gypsum core and the facer, despite of having a low surface roughness.

The gypsum board described herein may also comprise additives such as water resistant and/or water repellent agents in the core and/or in the mat, which makes it especially suitable to be used in humid or wet conditions. It is a solid substrate for finishing products and adhesives and can also be directly painted. Other additives can be also advantageously incorporated such as biocides, pigments or dyes and flame retardant agents in its core and/or fibrous mat.

Regarding the process of manufacture of said gypsum board, also some advantages worth to be mentioned, in particular that the edge forming is easier than on other non-woven liners: both creasers and scoring technologies can be used to groove the face liner. This operation is much easier than on thick coated glass mat, which can be prepared by creaser only. Moreover, in particular embodiments, the mats described herein may have a high air porosity, which may facilitate drying of the gypsum board. In particular embodiments, the drying speed can be increased by 10% without having the risks of blisters or separation between the liner and the core in first zones of the drier.

Thanks the high inner cohesion of particular embodiments of the mat, the gypsum board of the present invention may also be more resistant to friction and scratch when boards are mounted in the relevant systems.

Thus, the systems comprising the gypsum boards of the present invention may offer a suitable solution for internal and external applications to constructions even in wet or humid areas.

The gypsum board of the invention can be a very robust substrate for finishing products and adhesives, which are used both in internal and external applications. This robustness can be obtained thanks the strength of the gypsum core, the high cohesion of the mats of the invention, and thanks the good bonding of the mats and the core. It is an important factor in the usefulness of the board in applications that require the attachment of tiles or insulation material. This cohesion and bonding properties are very important for systems such as external sheathing walls, which are frequently covered with External Insulation Finishing Systems and can therefore withstand higher level of wind pressure. Similarly, partitions in wet rooms are mostly covered with ceramic tiles, which are bonded to the board surface. Thanks the high internal cohesion of the board both in dry and humid conditions, the robustness of the systems is improved without risk of tile de-bonding or delamination of the board surface.

More particularly, provided herein is a fibrous mat for a gypsum board comprising at least one ply of a non-woven fabric and a binder composition, wherein:
  said binder composition represents from 10 wt % (percent by weight) to 40 wt % of the total weight of the mat; and
  said binder composition comprises a copolymer comprising a co-monomer unit of a vinyl ester of an alpha branched aliphatic monocarboxylic acid, said copolymer being present in an amount from 25 wt % to 100 wt % of the binder composition weight.

Further provided herein is a process to produce the fibrous mat described herein. The process comprises the step of impregnating at least one ply of a non-woven fabric with an aqueous dispersion or solution of a binder composition as described herein.

Further provided herein is a gypsum board comprising a gypsum core with at least one side covered by a fibrous mat as described herein.

Further provided herein is a process for producing such gypsum board, comprising the step of laminating a gypsum core with at least one fibrous mat as described herein.

Further provided herein is a system for being used in the interior or exterior of a building comprising a gypsum board as described herein.

Definitions

Described herein is a fibrous mat for a gypsum board, said fibrous mat comprising a non-woven fabric and a binder composition. The fibrous mat is also referred to herein as "mat facer", "facer", and "mat".

In the sense of the present invention, the "non-woven fabric", also referred to herein as "non-woven material", means a fabric-like material made from fibres, bonded together by chemical, mechanical, heat or solvent treatment. "Non-woven fabric" is also referred to herein as "web". "Non-woven fabrics" can define sheets supports or web structures bounded together by entailing fibres or filaments. Therefore, in the sense of the present invention, a "ply" may also be named as "sheet" or "layer". The terms "mat" and "ply" are preferably used.

The fibrous mat may comprise one or more plies. In particular embodiments, the non-woven fabric may comprise an inner ply and an outer ply. The "inner ply" is the ply that contacts or is intended to contact the gypsum core of a plasterboard; more particularly it is the bottom ply, which is in contact with the screen during the mat production process. The "outer ply" is the ply that is or is intended to be farther from the gypsum core, i.e. located in the external side of the plasterboard and thus facing away from the plasterboard; more particularly it is the top ply formed over the bottom ply in the mat production process.

The term "screen" means a material made with a certain defined kind of yarns and mesh or wire. In a wet laid process the non-woven fabric is formed onto the screen by a de-watering step.

The term or expression "screen assembly" means a material that results from the superposition of a first base screen and a second screen onto which the wet laid non-woven fabric is formed. The inner ply of the facer is directly laid onto the second screen, and the outer-ply of the facer is formed over the inner ply.

The term "fibre" means a material form characterized by an extremely high ratio of length to diameter (e.g. 50/1). In the context of the present invention, the suitable fibre length is advantageously from about 0.1 cm to about 4 cm. The term "fibre" also covers a mixture of fibres of different nature, i.e. organic and inorganic fibres.

Typically, the non-woven is a fibre material forming a sheet support obtained from a random arrangement of individual fibres which are interlaid. They can be held together by adhesives, heat and pressure, or needling for example. Such non-woven supports can be prepared according to well-known processes such as melt-blowing, spin laying, carding, air laying and water laying.

The Sa surface roughness parameter corresponds to the arithmetic mean of the absolute values of ordinates Z(x,y) within a base area (A) with x and y defining this area. This parameter is well known to the skilled man in the art. In other words, the Sa parameter is obtained as follows:

$$Sa = \frac{1}{A}\int_{A} |z(x, y)| dx dy$$

DETAILED DESCRIPTION OF A PREFERRED EMBODIMENT

The subject matter of the invention relates to a fibrous mat facer for preparing a gypsum board, to a gypsum board comprising said mat facer and to a system comprising said gypsum board.

1. Fibrous Mat

In a first aspect, the present invention discloses a fibrous mat comprising at least one ply of a non-woven material and a binder composition, said binder composition representing from 10 to 40% of the total weight of the mat and comprising a copolymer comprising a co-monomer unit of a vinyl ester of an alpha branched aliphatic monocarboxylic acid, said copolymer representing from 25 wt % to 100 wt % (percent by weight) of the binder composition weight.

1.1 the Non-Woven Material

Typically, the non-woven is a material that can be made of fibres or strands, cut or uncut, oriented or not, so as to form a sheet support obtained from a random arrangement of individual fibres which are interlaid.

The non-woven material of the present invention or any of its plies, typically comprises fibres that are selected from organic fibres, mineral fibres, synthetic polymeric fibres, and mixtures thereof. Examples of said fibres are:
- organic fibres, such as cellulose based fibres such as flax, wood pulp, including hard and/or soft wood and mixtures thereof, cotton fibres, sisal and abaca;
- organic fibres which are man-made fibres derived from cellulose, including viscose, rayon, and lyocell;
- mineral fibres such as fibre glass, basalt;
- synthetic polymeric fibres, such as polyamide, polyaramide, polyethylene, polypropylene, polyester.

In a preferred embodiment, organic fibres represent more than 25 wt %, more than 30 wt %, more than 40 wt %, preferably more than 50 wt % of the weight of the non-woven material. The organic fibres are preferably cellulose or cellulose based fibres, which can be obtained from paper, paperboard or wood.

The cellulosic based fibres of the non-woven material may preferably comprise fibres of hard wood origin and/or of soft wood origin. The origin and balance of these fibres in the mat influence its physical properties such as tensile strength, tear strength, porosity, cohesion strength. Therefore, said fibres can be present in amounts of soft wood from 0 to 100 wt %, preferably from 25 to 85 wt % of the total weight of fibres and an amount of hard wood from 0 to 100 wt %, preferably from 0 to 50 wt % of the total weight of the fibres.

In a preferred embodiment, the non-woven material comprises mineral fibres and/or organic fibres and wherein the amount of organic fibres varies from 40 to 100 wt % of the total weight of the fibre composition, preferably from 40 to 85 wt %, more preferably from 50 to 75 wt %, even more preferably from 60 to 70 wt % of organic fibres in relation to the total weight of the fibre composition.

In a more preferred embodiment the fibres of the mat facer comprise or consist of glass fibres and/or cellulosic based fibres. This may provide an improved wet tensile strength, better bonding between inner ply and gypsum core and better behaviour in reaction to fire (lower gross calorific value). In particular, such facers may show a good balance strength over basis weight.

According to a preferred embodiment, the non-woven material is free or substantially free of polyester fibres. This means that the non-woven material may have the advantage of having a higher ratio of material from natural or mineral origin as well as a more cost effective product.

Fibre diameter can vary within broad ranges, for example from 2.0 µm to 40.0. However, it was surprisingly observed that fibres with a smaller diameter produce better mats. These mats can be lighter and stronger than the ones disclosed in the prior art. This may be due to a better arrangement of the thinner fibres which apparently result in a more efficient mat facer concerning the strength, in particular the tensile strength. This was found to apply in particular for mineral fibres. In preferred embodiments, mineral fibres have an average diameter below 25 µm, preferably from 6 µm to 20 µm, more preferably the average fibre diameter is from 10 to 15 µm Accordingly, in particular embodiments, the non-woven material of the mat facer comprises mineral fibres with an average diameter below 40 µm, preferably below 25 µm, more preferably from 6 µm to 20 µm, most preferably from 10 to 15 µm.

In a preferred embodiment, the non-woven material of the mat facer comprises a mixture of cellulose based fibres and glass fibres, said glass fibres having an average diameter from 6 to 20 µm, preferably from 10 to 15 µm; and the cellulose based fibres being present in the mixture in an amount from 40 to 85 wt % of the total weight of the fibres, preferably from 60 to 80 wt % of the total weight of the fibres.

In a further embodiment, the non-woven material consists in a mixture of cellulose based fibres and glass fibres, said glass fibres having an average diameter from 6 to 20 µm, preferably from 10 to 15 µm; and the cellulose based fibres are present in the fibre mixture in an amount from 40 to 85 wt % of the total weight of the fibres, preferably from 60 to 80 wt % of the total weight of the fibres.

In particular embodiments, the non-woven material comprises or consists of a mixture of fibres of cellulose based fibres having an amount of soft wood from 0 wt % to 100 wt %, preferably from 25 wt % to 85 wt %; and an amount of hard wood from 0 wt % to 100 wt %, of the total weight of the fibres, preferably from 0 wt % to 50 wt %, of the total weight of the fibres.

Typically, the fibres of the present invention are from 0.5 mm to about 40 mm in length. Preferably, the average length of the fibres can vary from 1.0 mm to 38 mm. The fibres may be a mixture of fibres having different length.

The surface structure of the non-woven material can be modified by conferring it a certain roughness (Sa) for improving the bonding of the mat facer with the gypsum core of a plasterboard. This surface modification may occur on just one side of the non-woven material (ex. inner side, which is in contact with the gypsum core) or on both sides (inner side+outer side, facing away from the gypsum core). The roughness of the mat facer may be changed through an embossing process. Possibly, the reorientation of the fibres of the non-woven material further to the embossing process, confers to the surface a specific roughness. It was observed that the roughness of the non-woven material was higher when the surface of the mat was embossed comparing to an unembossed surface. Therefore, it is possible to increase the anchoring of the mat to the gypsum board by combining an embossing pattern with a specific roughness on the surface of the mat facer.

Accordingly, both sides of the non-woven material may present a certain surface roughness. In particular embodiments, the inner side of the non-woven material presents a higher surface roughness than the outer side. In the most preferred embodiment, only on the inner side of the non-woven material is provided with an embossing pattern.

The mat facer of the present invention comprises at least one ply of a non-woven material. In preferred embodiments, the mat comprises two plies of a non-woven material, an inner ply, which is (or intended to be) in contact with the gypsum core; and an outer ply, which is (or intended to be) on the opposite side of the gypsum core, thus facing away from the gypsum core. Accordingly, the outer ply typically is in contact with the exterior and can be painted, covered with tiles or finished in another usual way.

These two plies may have the same composition or a different composition. However, the outer ply is advantageously essentially made of cellulose based fibres so as to provide a gypsum board that can be more conveniently handled since the outer ply does not cause itching or any other unpleasant feeling, in case that inorganic fibres such as e.g. glass fibres have been used in composition of the inner ply.

In a preferred embodiment, the composition of the inner ply is different from the composition of the outer ply. More particularly, the inner ply may comprise a mixture of organic fibres and mineral fibres wherein said fibres are present in the mixture in a ratio from 40 to 65 wt % of organic fibres to 35 to 60 wt % of mineral fibres; and/or the outer ply comprises preferably more than 90 wt % or more than 95 wt % or up to 100 wt % of organic fibres.

In a particular embodiment, the fibres of the outer ply comprise essentially cellulose; and the fibres of the inner ply comprise, by weight based on the total weight of the fibres, from 40 to 65 wt % of cellulose fibres, from 35 to 60% wt % of glass fibres. In preferred embodiments the fibres of the inner ply comprise from 45 to 60 wt % of cellulose fibres and from 40 to 55 wt % of glass fibres.

In a preferred embodiment, the mat facer of the present invention comprises one ply or more plies, more preferably two plies, one or more of said plies being provided with an embossing pattern and a specific roughness.

In a preferred embodiment, the at least one ply has a surface roughness Sa of less than 60 µm, preferably from 10 to 60 µm, more preferably from 12 to 40 µm. When the mat facer has two plies, an inner ply and an outer ply, both plies or just one of them may comprise said surface roughness Sa.

In a preferred embodiment, the inner ply has higher Sa than the surface roughness of the outer ply; and in an even more preferred embodiment, the Sa of the inner ply and of the outer ply are respectively from 10 to 40 µm, and less than 12 µm.

Therefore, in a preferred embodiment, the at least one ply is provided with an embossing pattern and has a surface roughness Sa of less than 60 µm, preferably from 10 to 60 µm, more preferably from 12 to 40 µm. When the mat facer has two plies, an inner ply and an outer ply, both plies or just one of them may comprise an embossing pattern and said surface roughness Sa.

In a preferred embodiment, both inner and outer plies have a surface roughness Sa, the inner ply having a higher Sa than the outer ply, wherein said Sa of the inner ply and of the outer ply are respectively from 10 to 40 µm, and less than 12 µm, the inner ply being provided with an embossing pattern.

1.2 The Binder Composition

The individual fibres may be held to each other by a binder composition. Said binder composition comprises at least a copolymer comprising a co-monomer unit of a vinyl ester of an alpha branched aliphatic monocarboxylic acid, also referred to herein as "vinyl ester copolymer". In other words, the binder composition comprises a copolymer obtained from a co-monomer composition comprising a vinyl ester of an alpha branched aliphatic monocarboxylic acid. Yet in other words, the copolymer comprises polymerized co-monomer units obtained from a vinyl ester of an alpha branched aliphatic monocarboxylic acid.

The vinyl ester co-monomers are typically polymerized via the vinyl moieties.

The term "alpha branched" means that the carbon atom directly bound to the carboxyl group of the monocarboxylic acid is also directly bound to at least two other carbon atoms of the monocarboxylic acid.

The binder composition represents from 10 to 40 wt % of the total weight of the mat, preferably it represents from 15 to 35 wt % of the total weight of the mat, even more preferably said binder composition represents from 20 to 30 wt % of the total weight of the mat.

Moreover, said binder composition comprises said copolymer comprising a co-monomer unit of a vinyl ester of an alpha branched aliphatic monocarboxylic acid, said copolymer being present in an amount from 25 to 100 wt % of the binder composition weight, preferably from 30 to 70 wt % of the binder composition weight, more preferably from 40 to 60 wt % of the binder composition weight. In a preferred embodiment, said binder composition further comprises a self-cross linkable compound. The binder composition may result in a better bonding strength between the facer and the gypsum board and in a better inner bonding between mat facers in case of using more than one mat. This is probably due to a better compatibility between the binding composition of the present invention and the interlocking of gypsum crystals within the skeleton of (mineral) fibres and between said fibres, in particular in case of thinner glass fibres (average diameter less than 25 µm, preferably from 6 µm to 20 µm, more preferably from 10 to 15 µm.

1.2.1 Compounds

As described above, the binder composition comprises at least one copolymer which comprises one or more co-monomer units of a vinyl ester of an alpha branched aliphatic monocarboxylic acid. The copolymer may be a random or statistical copolymer, a block copolymer, or a gradient copolymer. In preferred embodiments, the copolymer is a random or statistical copolymer.

One particularly useful group of vinyl ester of an alpha branched aliphatic monocarboxylic acid co-monomers are vinyl esters of saturated long chain carboxylic acids having about 5 to 20 carbon atoms, preferably from 7 to 15 carbon atoms.

Examples of suitable vinyl esters include vinyl neopentanoate, vinyl 2-ethylhexoate, ethenyl 2,2-dimethylheptanoate, ethenyl 2,2-dimethyloctanoate, and ethenyl 2,2-dimethyldecanoate.

Suitable co-monomers for the vinyl ester of an alpha branched aliphatic monocarboxylic acid, include co-monomers comprising a vinyl group, acryloyl group, or methacryloyl group; such as vinyl acetate, vinyl butyrate, vinyl propionate, Styrene, diacetone(meth)acrylamide, isobutoxymethyl(meth)acryl amide, N-vinylpyrrolidone, N-vinyl caprolactam, N,N-dimethyl(meth)acrylamide, t-octyl(meth)acrylamide, N,N-diethyl(meth)acrylamide, N,N'-dimethylaminopropyl(meth)acrylamide. Particularly suitable co-monomers are the group of acrylics that include methacrylic acid, 2-hydroxyethylmethacrylate, 2-hydroxypropylmethacrylate, 2-hydroxybutylmethacrylate, methylmethacrylate, ethylmethacrylate, propylmethacrylate, isopropylmethacrylate, butylmethacrylate, amylmethacrylate, isobutylmethacrylate, t-butylmethacrylate, pentylmethacrylate, isoamylmethacrylate, hexylmethacrylate, heptylmethacrylate, octylmethacrylate, isooctylmethacrylate, 2-ethylhexylmethacrylate, nonylmethacrylate, decylmethacrylate, isodecylmethacrylate, undecylmethacrylate, dodecylmethacrylate, laurylmethacrylate, octadecylmethacrylate, stearylmethacrylate, tetrahydrofurfurylmethacrylate, butoxyethylmethacrylate, ethoxydiethylene glycolmethacrylate, benzylmethacrylate, cyclohexylmethacrylate, phenoxyethylmethacrylate, polyethylene glycol monomethacrylate, polypropylene glycol monomethacrylate, methoxyethylene glycolmethacrylate, ethoxyethoxyethylmethacrylate, methoxypolyethylene glycolmethacrylate, methoxypolypropylene glycolmethacrylate, dicyclopentadienemethacrylate, dicyclopentanylmethacrylate, tricyclodecanylmethacrylate, isobornylmethacrylate, and bornylmethacrylate.

In a preferred embodiment, the vinyl ester copolymer of the binder composition is a copolymer obtained from a co-monomer which is a vinyl ester of an alpha branched aliphatic monocarboxylic acid and a co-monomer which is an acrylate monomer. Such copolymer is also referred to herein as "acrylic vinyl ester copolymer".

In particular embodiments, the binder composition does not comprise other polymers. However, it is envisaged that in other embodiments, the binder composition may comprise other polymers or copolymers in addition to the above-mentioned copolymer.

Suitable compounds that may be included in the binder composition of the present invention may be selected from the group consisting of or comprising urea formaldehyde, melamine formaldehyde, polyester, acrylics, methacrylics, styrene acrylic copolymers, styrene butadiene rubber, styrene butadiene styrene copolymers, polyvinyl chloride, etc., and mixtures thereof.

In preferred embodiments, the binder composition comprises a self-crosslinkable styrene-acrylic copolymer.

1.2.2 Amounts

In a preferred embodiment, the co-monomer unit of a vinyl ester of alpha branched aliphatic monocarboxylic acid is present in the vinyl ester copolymer in an amount from 20 to 70 wt % of said copolymer weight, preferably from 30 to 60 wt %, and more preferably from 40 to 50 wt % of the vinyl ester copolymer weight.

In a preferred embodiment, the binder composition represents from 20 to 30 wt % of the total weight of the mat, wherein said vinyl ester copolymer is present in the binder composition in an amount from 40 to 60 wt % of the binder weight. Preferably, the vinyl ester of alpha branched aliphatic monocarboxylic acid co-monomer of said vinyl ester copolymer may have a chain length from 7 to 15 carbon, and said co-monomer is present in the vinyl ester copolymer in an amount from 40 to 50 wt % of said copolymer weight. Even more preferably, the vinyl ester copolymer is an acrylic vinyl ester copolymer.

In a preferred embodiment, the mat facer of the present invention comprises a binder composition as described above and is free or substantially free of fluorocarbons and/or formaldehyde compounds. This allows the present facer to be classified in accordance with the most restrictive environmental and building norms since it does not release toxic residues to the surroundings of the gypsum boards where it is applied.

In a particularly preferred embodiment, the mat facer of the present invention comprises a binder composition which comprises or consists of mixture of
 a copolymer comprising a co-monomer unit of a vinyl ester of an alpha branched aliphatic monocarboxylic acid in an amount from 40 to 60 wt % of the binder composition weight;
 and an acrylic self-cross-linkable copolymer in an amount from 40 to 60 wt % of the binder composition weight.

In further embodiments, the copolymer comprising a co-monomer unit of a vinyl ester of an alpha branched aliphatic monocarboxylic acid is present in an amount from 45 to 55 wt % of the binder composition weight, and the acrylic self-cross-linkable copolymer is present in an amount from 45 to 55 wt % of the binder composition weight. In a particular embodiment, each of said binding agents is present in an amount of 50 wt % of the binder composition weight.

In specific embodiments of the fibrous mats described herein:
 the binder composition represents from 10 to 40 wt % of the total weight of the mat, more preferably from 20 to 30 wt %; and
 the binder composition comprises or consists of a mixture of a copolymer comprising a co-monomer unit of a vinyl ester of an alpha branched aliphatic monocarboxylic acid in an amount from 40 to 60 wt % of the binder composition weight, and of an acrylic self-cross-linkable copolymer in an amount from 60 to 40 wt % of the binder composition weight.

The binding composition may further be mixed with additives such as mineral filler particles, water resistant or water repellent agents, biocides, fire resistant agents and/or pigments. These additives may account from 0 to 50 wt % with respect to the weight of the non-woven fabric. In particular embodiments, these additives may account from 0 to 50 wt % with respect to the weight of binding composition.

The mineral filler particles may be selected from the group consisting of calcium carbonate, calcium sulphate, clay, kaolin, sand, talc, mica, glass powder, titanium dioxide, magnesium oxide, alumina, alumina trihydrate, aluminium hydroxide, antimony oxide, silica, silicate, etc. The dimensions of the filler are typically such that it substantially penetrates into the fibrous mat. For example, the mineral filler could be particles that have a $d_{50}$ from about 0.1 to about 10 micrometres, preferable about 0.5 to 5 micrometres.

However, the present inventors surprisingly found that non-woven material free or substantially free of mineral fillers result in mat facers with improved mechanical bonding. Without wishing to be bound by theory, it is though that the size of the pores and openings between the fibres of the non-woven material is increased, so that the interlocking with gypsums crystals is improved. Therefore, in a preferred embodiment, the mat of the present invention is free or substantially free of mineral fillers.

In particular embodiments, the binder composition may comprise one or more water resistant or water repellent agents such as fluorinated polymers. The amount of fluorinated additives may vary from 0.1 to 5 wt % based on the total weight of the nonwoven fabric, preferably from about 0.2 to 2 wt %. Fluorinated polymers can be for example emulsions of acrylic copolymers with perfluorinated acrylates. Other suitable water resistant additives include but are not limited to poly(vinyl alcohol), molten wax, emulsified wax/asphalt, emulsified wax, asphalt, metallic soaps, resins, polysiloxanes and synthetic thermoplastic synthetic materials such as polyvinylchloride, and polyvinylacetate. However, it is envisaged that in certain embodiments, the binder composition does not comprise a dedicated water repellent agent. In further embodiments, the mat is (substantially) free of mineral fillers and water repellent agents.

Examples of fire resistant additives include antimony based agent such as antimony trioxide, hydromagnesite, aluminium hydroxide, magnesium hydroxide, halogenated agents, nitrogen and/or phosphorous compounds such as polyphosphates. The amount of fire resistant additives can range from about 0.03 wt % to about 10 wt % of the mat.

As biocides, the most common compounds have fungicidal activity and are known in the art. Typically, the biocide agent is added with the binder composition in an amount from 0.01 to 5 wt %, preferably from 0.1 to 2 wt % of the total nonwoven weight.

In particular embodiments, the fibrous mat described herein may present a total basis weight of the mat is from 80 to 160 $g/m^2$, preferably from 90 to 140 $g/m^2$, more preferably from 110 to 130 $g/m^2$.

In particular embodiments, based on the final weight of the mat, the inner ply represents from about 30 to about 120 $g/m^2$, the outer ply represents from about 10 to about 70 $g/m^2$, and the binder composition represents from about 20 to about 60 $g/m^2$.

As regarding the ratio of tensile strength/basis weight of the fibrous mat of the present invention, is preferably at least 100 in ambient conditions (23° C.; 50% RH) when calculated in MD with 12000 N/m, and a weight of 120 g/m2, and preferably at least 50 after 2 hours immersion.

In addition to the above mentioned properties regarding hydrophobic characteristics and high tensile strength, the mat of the invention may provide better reaction to fire properties than traditional paper liners used for plasterboards. Thanks to a limited quantity of organic material in the mat, preferably below 100 g/m2, the surface Gross Calorific Value of the mat (as expressed in MJ/m2 according to EN ISO 1716) can be inferior the one of traditional paper liners. Moreover the combination of limited organic content in the mat and the reinforcement of the mat with mineral fibres, the board comprising the mat of the invention has can exhibit a better behaviour in fire resistance tests.

2. Process for Preparing a Mat Facer

The mat facer of the present invention is obtainable by a process comprising wet laying a suspension of fibres onto a screen or a screen assembly with the addition of a specific binder composition so as to form a web and draining water from the web to produce a mat facer with improved features such as being lighter, thinner stronger and having an increased bonding strength between the plies whilst maintaining the desirable water absorbing values required for the intended use in the manufacture of plasterboards.

In general, the process for making a mat facer comprising at least one ply of a non-woven material and a binder composition, typically comprises the following steps:
 wet laying a suspension of fibres onto a screen so as to form a web;
 drying the web;
 impregnating the web with a slurry composition solution; and
 drying the impregnated web.

The impregnation step is advantageously made in a size press.

2.1 The Slurry Composition

The slurry composition is prepared by mixing in a mixing tank the binders with the optional filler and additive agents mentioned in the previous section with water to obtain a slurry composition with a dry content from 10 to 50 wt %.

As mentioned above, some other compounds may be added to the binder composition in order to allow improving some desired properties of the mat facer of the invention.

2.2 The Screens

It is supposed that the use of a double screen assembly does not only form an embossed pattern on the bottom face of the non-woven fabric but also is responsible for a certain reorientation of fibres on the surface of the embossed pattern leading to the specific roughness. Therefore, whenever a mat facer with an embossed pattern and thus with a certain surface roughness is desired, the mat facer of the present invention may be obtained by using a screen assembly comprising more than one screen, for example by wet laying a suspension of fibres onto a double screen assembly instead onto a single screen.

In this case, the process of the present invention may comprise the following steps:
- wet laying a suspension of fibres onto a screen or a screen assembly so as to form a web;
- draining water from the web to produce the embossing pattern having a surface with the roughness Sa of less than 60 µm, preferably from 10 to 60 µm, more preferably from 12 to 40 µm or even less than 12 µm;
- drying the web having said embossing pattern;
- impregnating the web with a slurry composition solution; and
- drying the impregnated web.

The double screen assembly comprises a first screen (a base screen) and a second screen superimposed thereon, wherein the inner ply of the facer is directly laid onto the second screen and thereafter, the outer ply of the facer is formed over the inner ply.

This first base screen comprises thin yarns and thin mesh whereas the second screen comprises coarser yarns and coarser mesh. The superimposed screens modify the orientation of the fibres when water is drained through the openings of the coarser mesh.

Advantageously, the number of weft and warp yarns/cm of the first base screen is greater than that of the second screen. Preferably, the first base screen contains at least more than 4 times weft and warp yarns/cm than the second screen.

Therefore, in a preferred embodiment of the process for producing a mat facer according to the present invention:
- the first base screen comprises from 15 to 50 weft yarns/cm preferably from 20 to 35 weft yarns/cm, more preferably 32 weft yarns/cm, and from 15 to 50 warp yarns/cm, preferably from 20 to 35 warp yarns/cm, more preferably 32 warp yarns/cm;
- the second screen comprises from 1 and 15 weft yarns/cm, preferably, 7 weft yarns/cm, and from 1 and 15 warp yarns/cm, preferably around 6.3 warp yarns/cm;
- the ratio of apertures per $cm^2$ between the first and the second screen is at least 10, advantageously around 23.2.

Advantageously, the diameter of the weft yarns of the first base screen is smaller than the diameter of the warp yarns of the first base screen.

Therefore, in a preferred embodiment of the present invention,
- the first base screen comprises weft yarns having a diameter from 0.1 mm and 0.4 mm, advantageously equal to 0.18 mm, and warp yarns having a diameter from 0.1 mm and 0.4 mm advantageously around 0.22 mm; and
- the second screen comprises weft yarns having a diameter from 0.3 and 1.2 mm, advantageously equal to 0.7 mm, and warp yarns having a diameter from 0.3 and 1.2 mm, advantageously around 0.75 mm.

The fibrous mats described herein may be used as facer for gypsum boards. Gypsum boards may be provided with one or more mats. In particular embodiments, a gypsum board may be provided with a first mat as described herein, and a second mat. The second mat can also have an inner side and an outer side, said inner side contacting or intended to be in contact with the gypsum core and the outer side facing away from the gypsum core. The first and second mat are typically provided on the front side and the back side of the board, respectively.

The first and second mats may overlap each other as the first mat may be wrapped around the gypsum core. This is a well-known technique within the manufacturing industry of gypsum board.

The first and second mat facers may have the same of different fibre composition. According to a preferred embodiment of the invention, the first and second mats have the same fibre composition.

The inner sides of the first and second mat facers may also comprise an embossing pattern having the same surface roughness Sa of less than 60 µm, preferably from 10 to 60 µm, more preferably from 12 to 40 µm or even less than 12 µm. According to a preferred embodiment of the invention, the first and second mats have an embossing pattern.

A suitable process of manufacturing a mat having an embossing pattern may comprise:
- wet laying a first suspension of fibres onto a screen or screen assembly so as to form a web,
- then wet laying a second suspension on the outer side of the web and simultaneously draining water from the web to produce, on the inner side of the web, the desired embossing pattern;
- drying the web;
- impregnating the web with a slurry composition solution;
- drying the impregnated web.

Such process can involve the use of the screen assembly as described above.

Typically, in the impregnation step the fibrous mat is saturated with a slurry composition as a liquid or foam adhesive by immersion or soaking. The excess of adhesive is removed in a nip roll using a size-press applicator. The adhesive can also be deposited by spray on one face or the both faces. In the case of spray on one face, a conveyor belt can be used to support the fibrous mat and the penetration of the liquid adhesive in the fibrous mat can be improved with a vacuum pump on the opposite side of the spray and located beneath the conveyor belt. In all cases, the liquid adhesive is deposited uniformly over the surface and is penetrating across all the thickness of the fibrous mat, such that all the fibres in the mat are in total or partial contact with the adhesive. Accordingly, the binder composition as applied with the impregnation process is able to penetrate at least 90%, preferably at least 95%, more preferably at least 99% in the non-woven material.

As already mentioned, the mat facer of the present invention may have more than one ply i.e. it can be a single or multilayer non-woven material. It is preferably a two ply fabric, where the outer side of the non-woven fabric, which is in the opposite side of the gypsum core. In this case, the inner ply and the outer ply can be bound with the same binder composition.

Therefore, in a preferred embodiment, the mat has two plies, wherein the binder composition penetrates at least 90%, preferably at least 95%, more preferably at least 99% in the non-woven material. The use of this non-woven fabric for the manufacturing of a gypsum board suitable for wet areas is another aspect of the invention.

3. Gypsum Board or Plasterboard

Another aspect of the present invention relates to a gypsum board comprising a gypsum core with at least one side covered by a fibrous mat as described herein.

The plasterboard of the invention is particularly suitable to be used in wet or humid conditions. It can have better mechanical resistance, when compared with similar boards for wet and humid areas while maintaining good water repellence properties. It may show an improved bonding strength between the gypsum core and the facer despite of having a low surface roughness. Thus, it can provide a solid substrate for finishing products and adhesives and may also be directly painted.

The gypsum board as described herein is provided with a fibrous mat comprising a binder composition and a non-woven fabric as described above, and as further described below.

3.1 Binder Composition

Accordingly, in a first embodiment, the fibrous mat of said gypsum board comprises at least one ply of a non-woven material and a binder composition, said binder composition representing from 10 to 40 wt % of the total weight of the mat. In a preferred embodiment, the fibrous mat of said gypsum board comprises at least one ply of a non-woven material and a binder composition, said binder composition representing from 20 to 30 wt % of the total weight of the mat, wherein the vinyl ester copolymer of the binder composition is an acrylic vinyl ester copolymer, more particularly a copolymer obtained from a co-monomer which is a vinyl ester of an alpha branched aliphatic monocarboxylic acid and a co-monomer which is an acrylate monomer; said copolymer being present in the binder composition in an amount from 40 to 60 wt % of the binder weight. Preferably, the acrylic vinyl ester copolymer comprises a monomer of a vinyl ester of alpha branched aliphatic monocarboxylic acid having a chain length from 5 to 20 carbon atoms, preferably from 7 to 15 carbon atoms, and said monomer is present in the acrylic vinyl ester copolymer from 40 to 50 wt % of said copolymer weight.

In a preferred embodiment, the fibrous mat of said gypsum board comprises at least one ply of a non-woven material and a binder composition, said binder composition representing from 10 to 40 wt % of the total weight of the mat, preferably said binder represents from 15 to 35 wt % of the total weight of the mat, even more preferably said binder composition represents from 20 to 30 wt % of the total weight of the mat, and said binder composition comprises a copolymer comprising a co-monomer unit of a vinyl ester of an alpha branched aliphatic monocarboxylic acid, said copolymer being present in an amount from 25 to 100 wt % of the binder composition weight, preferably from 30 to 70 wt % of the binder composition weight, more preferably from 40 to 60 wt % of the binder composition weight.

In particular embodiments, the gypsum board as described herein further comprises additives in its gypsum core and/or in the binder composition, such as mineral filler particles (as clay for example, both for fire properties and catalyst for silicone and hydro properties), water resistant agents or water repellent agents, biocides, fire resistant agents and/or pigments.

Preferably, the gypsum board as described herein is free or substantially free of a mineral filler in the binder or in the mat composition. In this way, the size of pores and openings between the fibres of the non-woven material is increased, so that the interlocking with gypsums crystals is improved, hence the bonding between the fibrous mat and the core can be enhanced conferring better shear resistance at the interface between the fibrous mat and the gypsum core, and thus better flexural strength to the board comprising it, both in dry and humid conditions.

3.2 Fibres in the Fabric

The general role of the fibres in plasterboard is to provide a mechanical reinforcement to the gypsum core. When a gypsum board is exposed to flexural stress simulating the constraints in a system, the extreme layers of this board are submitted to high level of tensile stress. It is therefore critical to wrap the gypsum core with one or more strong mat facers, which can help to prevent the board from cracking or breaking.

Different types of fibres may be used, including but not limited to cellulose (based) fibres and/or glass fibres.

In the case of the cellulose fibres the main objective is to wrap the gypsum core with a strong, durable and smooth surface on the outer side of the board, so as to provide a board that is pleasant and not itchy to handle at installation, and that is compatible with all types of finishing modes and adhesives. When present, the role of cellulose fibres in the outer ply is also to confer a good tightness to gypsum slurry when the board is laminated after the mixer.

On the other hand, the role of glass fibres in the mats of a plasterboard can be regarded as threefold: (i) to reinforce the wet tensile strength, (ii) to ensure a good mechanical bonding at the interface with gypsum core thanks the interlocking of gypsum crystals between the interstices between glass fibres, and (iii) finally to stabilise the fibrous mat with regards to hydric variations.

In the present invention mat facers with different type of fibres and respective amounts may be selected to provide the gypsum boards with the desired properties.

Therefore, in one embodiment, the gypsum board comprises a fibrous mat having fibres that are selected from organic fibres, mineral fibres, synthetic polymeric fibres, and mixtures thereof wherein said mineral fibres are glass fibres and/or basalt, said synthetic polymeric fibres are polymer fibres selected from the group of polyamide, polyaramide, polyethylene, polypropylene, and/or said organic fibres are cellulose based fibres including, wood pulp, cotton fibres, sisal, abaca, viscose, rayon, and lyocell, which represent more than 25 wt %, more than 30 wt %, more than 40 wt %, preferably more than 50 wt % of the weight of the non-woven material.

In a preferred embodiment, the fibrous mat of said gypsum board comprises mineral fibres and/or organic fibres and wherein the amount of organic fibres varies from 40 to 100 wt % of the total weight of the fibre composition, preferably from 40 to 85 wt %, more preferably from 50 to 75 wt %, even more preferably from 60 to 70 wt % of organic fibres in relation to the total weight of the fibre composition.

In a preferred embodiment, the fibres of said gypsum board consist of glass fibres and/or cellulosic based fibres.

It was found that a fibrous mat with thin glass fibres can present increased tensile strength than another fibrous mat with coarser glass fibres. Accordingly, the fibrous mat may have fibres of a controlled diameter, as described above.

3.3 Embossing Pattern

In particular embodiments, said gypsum board comprises a fibrous mat having two sides, an inner side that is in contact with the gypsum core, and an outer side that is facing away from the gypsum core, wherein an embossing pattern is formed on at least one side of the mat, preferably the embossing pattern is formed in the inner side of the mat. In a more preferred embodiment, the embossing pattern is formed on the two sides of the mat.

In a preferred embodiment, both sides of the gypsum core comprise a specific surface roughness Sa, wherein the surface roughness of the inner side is higher than the surface roughness of the outer side, which are respectively from 10 to 40 μm, and less than 12 μm.

As described before, the mat facer has at least one ply, preferably more than one ply, even more preferably two plies. The two-ply configuration presents the additional advantage of allowing to design an asymmetrical fibrous mat with one outer ply being optimised for safer handing and compatibility with finishing and adhesive products, and with an inner ply being optimised for a strong and durable mechanical bonding with the gypsum core.

Accordingly, in a preferred embodiment, the gypsum board comprises a fibrous mat having two plies of a non-woven material as defined previously, an inner ply, which is in contact with the gypsum core, and an outer ply, which is in the opposite side of the gypsum core, and the composition of the inner ply is different from the composition of the outer ply.

Preferably, the inner ply comprises a mixture of organic fibres and mineral fibres and said fibres are present in the mixture in a ratio from 50 to 60% of organic fibres to 40 to 50% of mineral fibres, and the outer ply comprises more than 90% or more than 95% or up to 100% of organic fibres.

Moreover, when said gypsum board comprises a fibrous mat having two plies, these plies are preferably bound with the same binder composition, being said composition preferably a resinous composition, more preferably a self-cross linkable composition and/or an hydrophobic composition.

It was observed with surprise that the roughness was higher when the inner layer surface of the mat was embossed compared to an unembossed surface. Therefore, the combination of an embossed pattern with a specific roughness on its surface results in a strong improvement of the mat anchoring to the gypsum core. The outer ply of the non-woven fabric is generally unembossed even if it can be advantageous to propose an embossing pattern. Accordingly, in a particular embodiment of the present invention, both sides of the non-woven fabric (inner and outer sides) are subject to an embossing treatment allowing to achieve a better bonding, for example a good bonding with adhesives applied on site on the outer-ply of the board as well as in External Insulation Finishing System—EIFS).

3.4 Additives to the Core or Binder Composition

Besides gypsum, the gypsum core of the boards of the invention may further comprise water resistant and/or fire resistant agents in its core and/or in its fibrous mat.

Accordingly, in a preferred embodiment the gypsum core of said gypsum board comprises:
- at least a water-resistant additive, in an amount sufficient such that the core absorbs less than about 10%, preferably less than about 5%, more preferably less than about 3%, water when tested in accordance with ASTM method C-473 and/or in accordance with EN 520 method section 5.9.2.,
- at least a fire-resistant additive in an amount sufficient such that the board achieves an ASTM E-119 and/or C36-95 fire rating of at least about one hour, and/or
- set hydratable calcium sulphate, where said hydratable calcium sulphate is obtained from particles having a particle size distribution (as measured via Laser granulometry) such that, after splitting in water:
  - d10 is from 1 to 2 μm, and
  - d50 is from 5 to 35 μm, preferably d50 is from 5 to 20 μm, more preferably d50 is from 5 to 10 μm, or d50 is from 10 to 35 μm, preferably d50 is from 10 to 20 μm or d50 is from 20 to 35 μm, and/or
  - d90 is from 35 to 85 μm, preferably d90 is from 35 to 50 μm, or d90 is from 50 to 85 μm.

Preferably, said hydratable calcium sulphate has a particle size distribution by weight such that about 100% of the particles fit into pores less than 60 μm and at least about 90% of stucco particles fit into pores less than 40 μm, or about 90% of the particles fit into pores less than 60 μm and about 70% of stucco particles fit into pores less than 40 μm.

Water resistant additives, such as or silicone derivatives or wax, are typically introduced into the gypsum core to increase the hydrophobicity of the gypsum board. The water resistance of a gypsum board is typically characterized by the maximum allowed absorption of liquid water into the board, in accordance with either of norm ASTM C-473 or EN-520 or EN15 283-1. Examples of water resistant additives include poly(vinyl alcohol), molten wax, emulsified wax/asphalt, emulsified wax, asphalt, metallic soaps, resins, polysiloxanes and synthetic thermoplastic synthetic materials such as polyvinylchloride or polyvinylacetate to name a few. The amount of water resistant additives may vary between 0.05 wt % to about 5 wt % in reference of the total weight of the gypsum core.

Examples of fire resistant additives include mineral fibres (glass fibres, basalt fibres), and mineral fillers (clay, vermiculite, silica, alumina). The amount of fire resistant additives can be from about 0.03 wt % to about 10 wt %.

Further additives can be used, such as a biocide, particularly required for wet area gypsum board. Foaming agent is also typically used in the gypsum core slurry in order to decrease the total core weight. Typical gypsum core weight density ranges from 700 to 1000 kg/m³. Thickening or fluidizing additives are also typically used to control the rheology of the gypsum slurry. These could be respectively carboxymethylcellulose (CMC), hydroxymethylcellulose (HMC), hydroxyethylcellulose (HEC), starch, guar gums as thickening agents, and polycarboxylate ether as fluidizing agent. Starch, CMC, HMC or HEC are also used to impart better bonding between the gypsum core and the mat facer.

3.5 Properties of the Boards

The gypsum boards described herein may have a ratio of flexural strength/basis weight the mat of at least 5.5 in ambient conditions (23° C.; 50% RH) when calculated in MD with breaking load of 660N for a 12.5 mm board and a mat weight of 120 g/m2, and of at least 5 in humid conditions (30° C.; 90% RH).

In particular embodiments, the total basis weight of the fibrous mat of the gypsum board ranges from 80 to 160 g/m², preferably from 90 to 140 g/m², more preferably from 110 to 130 g/m².

In particular embodiments of the gypsum boards described herein, the fibrous mat comprises an inner ply and an outer ply; wherein the inner ply represents from about 30 to about 120 g/m², the outer ply represents from about 10 to about 70 g/m², and the binder composition represents from about 20 to about 60 g/m².

The board comprising the mat of the invention can be treated regarding the risk of mould growth, with biocide both in the impregnated mats and in the gypsum core. Thanks this double protection, the board with said mat can achieve a grade of 10/10 according to the ASTM D3273, which is the highest grade of mould resistance.

4. Process for Preparing a Gypsum Board

The invention also relates to a process for the manufacture of a gypsum board as described herein, and its use as a construction material, especially in wet areas such as a bathroom, a kitchen, or a laundry room for instance. Said gypsum board can be used in any wet area, indoor or outdoor.

The manufacturing process of the board of the invention can be very simple, since it can be carried out on a conventional wall board line. Especially, compared to previously known techniques, there is no need to specifically tune the viscosity of the plaster slurry, since the plies usually exhibit a blocked porosity with the impregnated outer ply such that the gypsum will not substantially penetrate into the mat-facer.

The process for manufacturing a gypsum board typically comprises the deposition a plaster slurry on at least one mat-facer of the invention, preferably on the inner ply of this mat.

In a preferred embodiment, the gypsum board of the present invention comprises two mats. Therefore, the respective process for producing said plasterboard comprises an additional step of covering with a second non-woven fabric (mat) on the side of the gypsum that is not already covered with the first non-woven fabric.

Optionally, the process for producing a gypsum core of the present invention also comprises mixing the desired additives in the amounts specified previously to the plaster slurry.

The process for producing a gypsum board of the invention may also comprise a process to produce the mat facer according to the invention. Thus, in a more preferred embodiment, said process also comprises the following steps:
  wet laying a suspension of fibres onto a screen so as to form a web;
  impregnating the web with a slurry composition solution; and
  drying the impregnated web.

The impregnation step is advantageously made in a size press.

As mentioned before, the boards of the present invention preferably comprise an embossing pattern on at least one of the sides of the mat facer. Therefore, in a more preferred aspect of the present invention, the process for producing said boards comprises the following steps:
  wet laying a suspension of fibres onto a screen or a screen assembly so as to form a web;
  draining water from the web to produce the embossing pattern having a surface with the roughness Sa of less than 60 µm, preferably from 10 to 60 µm, more preferably from 12 to 40 µm or even less than 12 µm;
  drying the web having said embossing pattern;
  impregnating the web with a slurry composition solution; and
  drying the impregnated web.

As mentioned before, the boards of the present invention preferably comprise more than one mat, preferably two mat facers. The inner sides of the first (and optional second) mat facer may also comprise an embossing pattern having the same surface roughness Sa of less than 60 µm, preferably from 10 to 60 µm, more preferably from 12 to 40 µm or even less than 12 µm. According to a preferred embodiment of the invention, the process for producing a plasterboard comprises the following steps:
  wet laying a first suspension of fibres onto a screen or screen assembly so as to form a web,
  then wet laying a second suspension on the outer side of the web and simultaneously draining water from the web to produce, on the inner side of the web, the desired embossing pattern;
  drying the web;
  impregnating the web with a slurry composition solution;
  drying the impregnated web.

Such process involves advantageously the use of the screen assembly as previously disclosed.

5. System Comprising a Gypsum Board

The gypsum board of the present invention can be used in a variety of applications, both indoors and outdoors. As an example of an indoor application, one may mention shaft wall assemblies, tile backing as well as partitions and ceilings in wet area rooms.

A gypsum board as described herein can be used to particular advantage as a component of a partition or shaft wall assembly or similar assembly in the interior of a building. In such application, the mat-faced board can be used with particular advantage in place of conventional paper-faced gypsum core board or shaft liner panels, the core of which may include fire-resistant additives. Assemblies of this type generally comprise metal or wood framework or studs for support of the gypsum panels which form the partitions in bathrooms and other wet or humid areas, the walls of the shafts of elevators, stairwells and the like. Mat facer gypsum board, as described herein, can be used, for example, as the shaft liner panel. For use in such application, the core of the board can include fire resistant additives.

One may refer to U.S. Pat. No. 4,047,355, incorporated herein by reference, for details on a shaft wall assembly. The present gypsum board can also be used with advantage in aeraulic ducts, in a manner similar to WO-A-02/06605.

The present gypsum board can also be used with advantage as a tile backing in bathrooms. The usual construction of bathroom walls includes a ceramic tiles adhered to an underlying base member, for example, a panel of gypsum board of the invention. Such a panel is referred to in the industry as a "tile backing board," or "tile backer". In usual fashion, sheets of tile backer are fastened by rust-resistant nails or screws to studs. The board joints and screw heads are then treated in a conventional manner with a water-resistant compound before the surface is finished, for example, by paint or ceramic tiles.

Wall-to-wall and floor-to-wall joints may be treated additionally with conventional sealants or corking compounds before the surface is finished.

Pieces of ceramic tiles are adhered to the sheets of tile backer by water-resistant adhesive (e.g. "mastic") or by a Portland cement-based adhesive (e.g. "setting mortar"), the latter case being mostly for floor applications. Thereafter, spaces between the tiles and between the tiles and other adjoining surfaces are filled with a water-resistant material (the "grouting").

The present gypsum boards will also be useful in any application for partitions and ceilings in wet area rooms. Also, the boards of the invention can be used in any application for which wall boards are known to be useful, including drywall.

As outdoor applications, one may mention especially, roof deck system and EIS (Exterior Insulating System) and EFS (Exterior Finishing System), which latter systems will be disclosed in more details below.

A typical roof deck system incorporating the gypsum boards of the invention is as follows. In this construction, spaced parallel trusses extending between building support members support usually a (corrugated) metal deck which is fastened to the trusses. Layers of insulating sheet material (e.g. expanded polystyrene) are disposed on the corrugated metal deck. A gypsum board of the invention is secured to the corrugated deck by means of fasteners. The joints of the boards are sealed in a conventional way by application of tape. Overlying the gypsum board is a waterproof roofing membrane.

Typically this membrane comprises alternate layers of asphalt and roofing felt. A final coating of asphalt may be covered with a topping layer.

One may refer to U.S. Pat. No. 4,783,942, incorporated herein by reference, for details on a roof deck system. Exterior Insulating Systems and Exterior Finishing systems. An EIS system typically comprises insulating material which is sandwiched between an underlying support surface and an exterior finishing material which can be an integral part of the insulating material, but which is usually applied to the insulating material at the site of installation. From one EIS system to the next, there exist variations in structural details and components. For example, although the exterior finishing material may be affixed directly to the insulating material, various systems include a reinforcing component sandwiched between the exterior finishing material and the insulating material. The reinforcing component comprises generally one or more plies of fibre glass reinforcing fabric or mesh which is adhered by suitable mastic to the surface of the insulating material. In some systems, the support surface is affixed to a wooden frame attached to the exterior surface of the outside wall of a building, whereas in other systems a metal frame is used. In certain applications, the support surface may be affixed directly to the exterior surface of an outside wall, for example, one comprising cinder blocks or concrete blocks. The adhesive or mastic for adhering together components of the system tends to vary from one system to the next, and are known. They typically comprise specially formulated proprietary compositions. Mechanically fastened insulation is also suitable. The improved support surface of the present invention can be used satisfactorily and to good advantage in EIS systems which include overlying plies of insulating and exterior finishing materials, and other optional components. The insulating material is generally substantially free of channels penetrating there through.

One useful insulating material in EIS systems is expanded or foamed polystyrene, a material which has good moisture resistant properties. Although it has desirably low water vapour transmission, it is not a vapour barrier, but instead is capable of breathing. Rigid panels of expanded polystyrene are used most widely in EIS systems. Such panels have satisfactory compressive strength and resilience and are presently available in varying thicknesses and lengths.

Other thermal insulating materials can be used in EIS systems also. Examples of such materials include extruded polystyrene, polyurethane, polyisocyanurate, cement-based insulating plasters, and phenolic foam. Insulating materials generally have low thermal conductivity and low density.

As mentioned above, various EIS systems include a reinforcing component, for example, in cloth form, sandwiched between the insulating material and the exterior finishing material. Glass cloth can be used in a conventional manner to reinforce the system, that is, to improve the impact strength of the system. The particular type or types of glass cloth used and the number of plies thereof which are used depend on the impact resistance which is desired. Examples of reinforcing cloth or fabric which can be used in the system are woven glass, glass fibre scrim and glass fibre mesh. A coating can be applied on the reinforcing cloth or fabric to protect from alkali attack in the adhesive. Installation of the reinforcing fabric generally involves applying a suitable adhesive to the surface of the insulating material and then applying the fabric thereto. Additional plies of fabric can be applied if desired. A cement/acrylic resin is an example of an adhesive that can be used.

The exterior finishing material can be affixed directly to the insulating material or to an intermediate surface such as, for example, the surface of a reinforcing member as described above. The exterior finishing material has weathering characteristics and is preferably appealing in appearance. Generally, an exterior finish that can be used is a conventional dry product that is mixed with water and then which is spread or troweled on the underlying substrate. Alternatively, one may use an acrylic resin-based composition which is available in a paste-type form. After application, the resin sets to form a tough, weather-resistant solid material which adheres tightly to the underlying substrate. Such resin compositions are available commercially in a variety of colours. They usually include aggregate which can vary in size. This allows the applicator to choose a particular composition which permits him to apply a finish that can vary in texture from fine to coarse. Examples of other materials that can be used as an exterior finish are Portland cement including, for example, sand and larger aggregate.

The exterior finish can vary in thickness over a wide range, as is known in the art, with a coating or layer thickness of about 2 to 6 mm being exemplary.

Different systems may have a different number of layers applied in the system. One typical example is the following in commercial applications: steel studs, building wrap (like Tyvek®), gypsum board, trowel on adhesive, EPS insulation, trowel on Portland cement-based adhesive, glass scrim reinforcement, "brown" support coat of Portland cement-based adhesive, and finally a colour coat of Portland cement based mortar or a coat of paint.

The gypsum board of the present invention can be used also to good advantage in place of conventional gypsum sheathing in applications other than EIS systems, i.e. these systems having no insulating material. Thus, the board can be used as an underlying support surface which is covered with overlying finishing materials, for example, aluminium, wood siding, plaster and Portland cement.

Numerous advantages flow from the use of the present invention. An EIS system which includes a mat-facer gypsum support surface that has affixed thereto insulating material by adhesive only, that is, without fastening means which extend through the insulating material, has higher tensile or cohesive strength than a like system which includes conventional paper-faced gypsum board. The mat-facer of the gypsum support member is water resistant. This improved water resistance gives the applicator greater flexibility in selecting adhesives that can be used to adhere insulation directly to the mat-faced surface of the gypsum support element as adverse effects are not encountered by the use of water-based adhesives. The mat-facer of the gypsum support element is "nailable", and accordingly, it can be secured readily to an underlying frame or other substrate by nailing. The improved support surface of the present invention has improved rigidity and strength uniformity in both the length and width dimensions of the system.

The preferred embodiment of the invention which includes the use of a water-resistant core provides a substantially improved weather-resistant product which better resists degradation both within and outside of the system. One may refer to U.S. Pat. Nos. 4,647,496, 5,319,900 and 5,552,187, all incorporated herein by reference, for details on Exterior Insulating Systems and Exterior Finishing systems The invention offers a further advantage. It is known that the stucco that is used for the manufacture of gypsum boards has different qualities depending on the sourcing and origin of the stucco. It may be natural or it may be FGD, for example. Hence, there is a need for a facer that would eliminate any consequence of the variation between different stuccos and afford high level properties, irrespective of the type of stucco. The invention affords such a facer, which is effective with both fine and coarse stuccos. Without wishing to be bound by theory, the Applicants believe that the roughness of the facer is such that it allows entanglement, at least partial (for example 70%) of stucco particles within the fibres of the facer (inner face/inner ply).

The following FIGURES and examples illustrate the invention without limiting its scope.

EXAMPLES

Example 1: Composition of the Mat Facers

This example illustrates some specificities of the mat facers according to the present invention and existing ones for comparative purposes. Eleven mat facers having 2 plies (inner ply+outer ply) of a non-woven material were obtained according to the following process:

1.1 Composition of the Plies:
1.1.1 Inner Ply (IP):
A mixture of fibres comprising cellulose, glass and polyester fibres was prepared according to the following amounts:
  Cellulosic fibres: from 45 to 57 wt % of the total weight of fibres, with a length of about 2.5 to 5 mm and a diameter of about 30 micrometres,
  Glass fibres: 41 to 45 wt % of the total weight of fibres, with a diameter and length of respectively: (i) 23 micrometre and 13 mm, or (ii) 11 micrometres and 6 mm;
  PET: from 0 to 14% of the total weight of fibres of polyester PET fibres (1.7 dtx-6 mm).
The obtained inner ply weight was from 66 and 79 g/m2.
1.1.2 Outer Ply (OP)
A 100% cellulosic mixture was used (length the fibres of about 2.5 to 5 mm, diameter of about 15 to 30 micrometres).
The obtained outer ply weight was from 20 to 24 g/m2.
1.2 Formation of the Plies
The inner and the outer plies were manufactured on an industrial papermaking line according to a common wet-laid process such as described in EP-A-0 889 151. According to this process, said papermaking line comprises a primary head box and a secondary head box wherein first and second dispersions of fibres are respectively prepared, each of them corresponding to the respective composition described earlier, i.e. first dispersion (1.1.1=IP) and second dispersion (1.1.2=OP).

The inner and outer plies were formed on either a single screen (SS) or a double screen (DS) configuration:
1.2.1 Single screen (SS): The inner ply was formed by wet-laying the first dispersion of fibres on a screen comprising 32 wrap yarns/cm having a diameter equal to 0.18 mm and 32 weft yarn/cm having a diameter equal to 0.22 mm. Then the outer ply was formed over the inner ply by wet-laying the second fibre suspension onto the outer ply.
1.2.2 Double screen (DS): The inner ply was formed on a double superimposed screen having:
The first base screen comprises 32 wrap yarns/cm and 32 weft yarns/cm,
The second screen comprises 6.3 wrap yarns/cm and 7 weft yarns/cm,
The ratio of apertures per cm2 between the first and the second screen is equal to 23.2,
The first base screen comprises wrap yarns having a diameter equal to 0.22 mm and weft yarns having a diameter equal to 0.18 mm,
The second screen comprises wrap yarns having a diameter equal to 0.75 mm and weft yarns having a diameter equal to 0.7 mm.
Then the outer ply was formed over the inner ply by wet-laying the second fibre suspension onto the outer ply.

The assembled plies were then impregnated in a size press with a slurries comprising (i) a binder composition and (ii) additives:
  i) Binder composition based on the following polymeric dispersion and/or blend thereof. The amounts of each compound refer to the total weight of the binder composition (wt %):
  Self-cross-linkable acrylic copolymer dispersion (I),
  Copolymer dispersion of [60% acrylic and 40% vinyl ester of an alpha-branched aliphatic monocarboxylic acid of 9 or 10 carbons] (II),
  Copolymer dispersion of [34% acrylic and 50% vinyl ester of an alpha-branched aliphatic monocarboxylic acid of 9 or 10 carbons] (III).
In result, the following four binder compositions were obtained: inventive compositions B2, B3 and B4, and comparative compositions B1 and B5 (see Table 1). The binder composition B5 consisted of a self-cross-linkable copolymer dispersion of vinyl acetate and acrylate (IV).

TABLE 1

| Binder compositions | | | | | |
|---|---|---|---|---|---|
| Binder composition (Dry wt %) | B1 | B2 | B3 | B4 | B5 |
| Acrylic copolymer self-cross-linkable binder (I) | 100 | 0 | 50 | 68 | 0 |
| Copolymer binder of [60% acrylic and 40% vinyl ester of an alpha-branched aliphatic monocarboxylic acid of 9 or 10 carbons] (II) | 0 | 0 | 50 | 32 | 0 |
| Copolymer binder of [34% acrylic and 50% vinyl ester of an alpha-branched aliphatic monocarboxylic acid of 9 or 10 carbons] (III) | 0 | 100 | 0 | 0 | 0 |
| self-cross-linkable copolymer dispersion of vinyl acetate and acrylate (IV) | 0 | 0 | 0 | 0 | 100 | ii) Optional Additives
  Mineral filler (Kaolin Clay was used with an average particle diameter such that $D_{50}$ is from 1 to 5 micrometres),
  Fluorocarbon water repellent polymer (a perfluoroacrylate copolymer dispersion was used)
  Fungicide and dye pigments.
The following slurry compositions were obtained: comparative slurry compositions S1 and S5, and inventive slurry compositions S2, S3, S4, and S6 (see Table 2).

TABLE 2

| Slurry composition (Dry wt %) | S1 | S2 | S3 | S4 | S5 | S6 |
|---|---|---|---|---|---|---|
| Binder composition B1 (COMP) | 65 | 0 | 0 | 0 | 0 | 0 |
| Binder composition B2 (INV) | 0 | 100 | 0 | 0 | 0 | 0 |
| Binder composition B3 (INV) | 0 | 0 | 66 | 0 | 99 | 0 |
| Binder composition B4 (INV) | 0 | 0 | 0 | 66 | 0 | 0 |
| Binder composition B5 (COMP) | 0 | 0 | 0 | 0 | 0 | 100 |
| Kaolin Clay | 33 | 0 | 33 | 33 | 0 | 0 |
| Perfluoroacrylate copolymer dispersion | 1 | 0 | 0 | 0 | 0 | 0 |
| Fungicide and dye pigments | 1 | 0 | 1 | 1 | 1 | 0 |

The plies are then dried and cured at 135° C. for 5 min and after at 160° C. for 1 min (these are equivalent conditions for drying and curing respectively on hot plate and convective oven lab equipment) In result, the following mat facers were obtained: F1 to F11.

The obtained mat facers are shown in Table 3, according to the composition of the respective plies, screen forming and slurry composition.

The mat facers F1 to F6 are comparative examples, i.e. mat prepared according to prior art for comparative purposes. Mat facers F7 to F11 are inventive examples, i.e. prepared according to the present invention.

Comparative mat facers F1 and F2 have the same slurry composition differing by the screen assembly used for the formation of the inner and outer ply: mat facer F1 was formed by using a single screen, while F2 was formed by using a double screen configuration.

Comparative mat facers F3, F4, F5, F6 and the inventive mat facers F7, F10 and F11 were made with glass fibre of 11 micrometre or a blend of glass fibre of 11 and 16 micrometre. Comparative mat facer F4, F5, F6 and inventive mat facer F7 have the same inner ply fibre composition and fibre amount. These facers fibre composition further comprises polyester fibre in addition to the cellulose and the glass fibre (IP4=IP5=IP6=IP7). Inventive mat facers F10 and F11 have the same inner ply fibre composition and fibre amount which consists only of cellulose and glass.

Example 2: Surface Roughness Measurement

As described above, each of the mat facers comprised an inner ply and an outer ply, as well as a respective inner side and outer side. In some of inventive mat facers, these two sides were characterized by their inner surface roughness (inner side in contact with the gypsum core) and their outer surface roughness (outer side opposite to gypsum core and thus is not in contact with it).

TABLE 3

Mat facers characterization

| Mat facer | Ply | Glass (Dry wt %) | Cellulose (Dry wt %) | PET (Dry wt %) | Glass fibre size (μm) | Basis weight (g/m$^2$) | Screen config. | Comp. | Basis weight (g/m$^2$) | binder weight wt %** | Total mat weight (g/m$^2$) *** |
|---|---|---|---|---|---|---|---|---|---|---|---|
| F1 (COMP) | OP1 | 0 | 100 | 0 | NA | 22 | SS | S1 | 57 | 23 | 158 |
|  | IP1 | 41 | 45 | 14 | 23 | 79 |  |  |  |  |  |
| F2 (COMP) | OP2 | 0 | 100 | 0 | NA | 24 | DS | S1 | 57 | 23 | 158 |
|  | IP2 | 41 | 45 | 14 | 23 | 77 |  |  |  |  |  |
| F3 (COMP) | OP3 | 0 | 100 | 0 | NA | 22 | SS | S1 | 54 | 24 | 148 |
|  | IP3 | 46 | 40 | 14 | 16 & 11* | 72 |  |  |  |  |  |
| F4 (COMP) | OP4 | 0 | 100 | 0 | NA | 22 | SS | S1 | 48 | 22 | 139 |
|  | IP4 | 45 | 45 | 10 | 11 | 69 |  |  |  |  |  |
| F5 (COMP) | OP5 | 0 | 100 | 0 | NA | 22 | SS | S6 | 31 | 25 | 122 |
|  | IP5 | 45 | 45 | 10 | 11 | 69 |  |  |  |  |  |
| F6 (COMP) | OP6 | 0 | 100 | 0 | NA | 22 | DS | S1 | 49 | 23 | 140 |
|  | IP6 | 45 | 45 | 10 | 11 | 69 |  |  |  |  |  |
| F7 (INV) | OP7 | 0 | 100 | 0 | NA | 22 | SS | S2 | 29 | 24 | 120 |
|  | IP7 | 45 | 45 | 10 | 11 | 69 |  |  |  |  |  |
| F8 (INV) | OP8 | 0 | 100 | 0 | NA | 22 | SS | S3 | 57 | 24 | 158 |
|  | IP8 | 41 | 45 | 14 | 23 | 79 |  |  |  |  |  |
| F9 (INV) | OP9 | 0 | 100 | 0 | NA | 22 | SS | S4 | 57 | 24 | 158 |
|  | IP9 | 41 | 45 | 14 | 23 | 79 |  |  |  |  |  |
| F10 (INV) | OP10 | 0 | 100 | 0 | NA | 20 | SS | S5 | 31 | 25 | 120 |
|  | IP10 | 43 | 57 | 0 | 11 | 89 |  |  |  |  |  |
| F11 (INV) | OP11 | 0 | 100 | 0 | NA | 23 | DS | S5 | 31 | 25 | 120 |
|  | IP11 | 43 | 57 | 0 | 11 | 66 |  |  |  |  |  |

*OP3 comprises a blend of glass fibre with with diameter of 16 and 11 micrometres respectively in relative 76:24 dry weight ratio;
NA = Not Available
**Total binder weight in the mat facer (wt %)
*** Total mat basis weight (g/m2)

From the Table 3, we can see that all the prepared mat facers have the same outer ply fibre composition and fibre amount and result in a basis weight of about 22 g/m$^2$ (OP1≈OP2≈OP3 . . . OP11).

Comparative mat facers F1 and F2, and the inventive mat facers F8 and F9 have the same inner ply fibre composition and fibre amount (IP1≈IP2≈IP8≈IP9). Mat facers F1, F2, F8 and F9 were made with glass fibre of 23 micrometre diameter.

For the analysis of the Sa surface roughness parameter, the analysed area (A) of the mat corresponded to 3.5 mm by 3.5 mm.

Roughness area profiles of the mats were obtained through an optical measurement method based on enhanced white light vertical scanning interferometry.

A vertical scan white light interferometry microscopy tool is leading to the surface topography through a white light interferometry of 2 light beams. The first beam is reflected by a perfect flat mirror which forms the reference surface and the second is reflected by the sample which has a certain topography. The 2 beams interfere and form a figure consisting of alternate dark and bright fringes: the interferogram pattern. When the distances travelled by light from the sample surface and that of the mirror are identical, the light intensity on the detector is maximum. The two waves are then said to be in phase or at zerochromatic order. Conversely, when the 2 distances are becoming different, intensity oscillates for a short time and then decrease very quickly. The principle involves shifting the reference mirror and locating the greatest intensity during scanning.

Experimental data have been collected on the TOPO3D instrument at the CTP (Centre Technique du Papier, Grenoble, France). The Sa values of the mat facers are listed in table 4.

TABLE 4

Surface roughness (Sa) of some mat facers

| Sa value (micrometres) | F1 mat | F2 mat | F10 mat | F11 mat |
|---|---|---|---|---|
| Inner surface | 22.0 | 29.3 | 13.8 | 17.2 |
| Outer surface | 11.3 | 11.7 | NA | 7.0 |

NA = Not Available

Comparative mat facers F1 and F2 have the same fibre composition being the only difference between them, as already mentioned before, that F2 mat was obtained with a double screen configuration. Identically, inventive mats F10 and F11 have the same fibre composition being the only difference between them that F11 was obtained with a double screen configuration. F1 and F2 were made with 23 micrometre glass fibres while F10 and F11 were made with 11 micrometre glass fibres.

Table 4 clearly shows the effect of double screen on the inner surface roughness. It is assumed that the use of the double screen in comparative mat F2 and inventive F11 not only confers a specific embossing pattern to the surface but also rearrange the fibres on the surface of the pattern.

Surprisingly, the results show that the effect of the double screen on the increasing of the inner surface roughness is more important in the case of 23 micrometre glass fibre, although there is still an increase of roughness in the case of 11 micrometre glass fibre.

The results also show that the use of glass fibre of 11 micrometre in F10 and F11 is leading to surface roughness lower than in the case of glass fibre of 23 micrometre.

Table 4 also clearly shows the roughness difference between the inner surface and the outer surface. The roughness of the outer ply of comparative facers F1 and F2 is similar since the second dispersion of fibres forming both outer plies is the same and was applied in the same conditions on the inner ply of both F1 and F2. It was also noted that the roughness of the outer surface is much lower than the roughness of the inner surface.

Example 3: Mat Facer Characterization

The obtained the mat facers were tested for various properties which are important for the final gypsum board manufacturing and performance such as basis weight, air permeability, tensile strength and water barrier.

Test Methods:

4.1 Basis Weight

Basis weight was measured according to ISO536:1997 standard on a 100 cm$^2$ area. The results are expressed in g/m$^2$.

4.2 Air Permeability:

Air permeability was measured according to TAPPI T251 cm-85 standard under a 196 Pa pressure drop. The results are expressed in L/m2/s.

4.3 Dry Tensile Strength:

Measurements were taken according to TAPPI Standard T494 om-96 with the following modifications: 50 mm strips were used, the initial jaw distance was 127 mm, and the break force value was recorded as the maximum of the recorded force curve instead of 25 mm strips.

Tensile strength is measured both in machine direction (MD) and cross-direction (CD). The arithmetic average of machine direction and cross direction is also given. The results are expressed as "Tensile index", which is the average tensile strength divided by the basis weight.

4.4 Cobb 60 was Measured According to ISO535 Standard.

Cobb two hours (2H) and water absorption 2H were measured according to modified ISO535 method. The method consists of measuring the cobb values as in ISO535, but after 120 minutes contact time, under 20 mm waterhead, and with one layer of a blotter paper (e.g. reference 0903F00023 from Filtres Fioroni) below the non-woven fabric. The water absorption 2H is the weight increase of the blotter paper from the water absorption and is expressed in g/m$^2$ as for the cobb values. For cobb 60, cobb 2H and water absorption 2H, the water is in contact with the outer surface of the mat facer.

All testing were conducted under laboratory conditions at a temperature of 23.0±1.0° C. and 50.0±2.0% relative humidity (RH). After that samples were stabilised in weight under these conditions for at least 24 hrs.

The properties of the mat facers F1 to F11 are given in Table 5. As a reminder, the mat facer F1 to F6 are comparative examples and mat facer F7 to F11 are inventive examples.

TABLE 5

Mat facer characterization

| Characteristic | Unit | F1 | F2 | F3 | F4 | F5 | F6 | F7 | F8 | F9 | F10 | F11 |
|---|---|---|---|---|---|---|---|---|---|---|---|---|
| Basis weight | g/m$^2$ | 158 | 158 | 148 | 139 | 122 | 140 | 120 | 158 | 158 | 120 | 120 |
| Air permeability | L/m2/s | 37.8 | 37.6 | 2 | 67 | 51.7 | 32.3 | 105 | 45 | 45 | 43.5 | 59.3 |
| Tensile strength MD | N/m | 12487 | 11582 | 13018 | 12473 | 15060 | 10974 | 10851 | 11021 | 11281 | 14095 | 13557 |
| Tensile strength CD | N/m | 4627 | 4477 | 4668 | 5217 | 5456 | 4811 | 4585 | 4645 | 4856 | 5201 | 4644 |
| Tensile strength MD/CD average | N/m | 8557 | 8030 | 8843 | 8845 | 10258 | 7893 | 7718 | 7833 | 8069 | 9648 | 9101 |

TABLE 5-continued

Mat facer characterization

| Characteristic | Unit | F1 | F2 | F3 | F4 | F5 | F6 | F7 | F8 | F9 | F10 | F11 |
|---|---|---|---|---|---|---|---|---|---|---|---|---|
| Tensile index | | 54.2 | 50.8 | 59.8 | 63.6 | 84.1 | 56.4 | 64.3 | 49.6 | 51.1 | 80.4 | 75.8 |
| Cobb 60 | $g/m^2$ | 6.8 | 5.9 | 6.2 | 8.6 | 8.5 | 5.5 | NA | 9.6 | 9.3 | 9.7 | 8.6 |
| Cobb 2H | $g/m^2$ | 21.5 | 21.3 | 11.5 | 37 | 130 | NA | 23 | 23.4 | 26.8 | 23.6 | 24.8 |
| Waterabsorption 2H | $g/m^2$ | 46.8 | 45.7 | 45 | 52 | 210 | NA | 57.1 | 47.1 | 49 | 53.9 | 51.6 |

NA: Not available

Tensile strength is a key property for a plasterboard mat facer as it is directly related to the flexural strength of the board which is an essential requirement for plasterboard. Machine direction tensile is particularly important as this is the most critical direction for the final plasterboard. Because tensile strength is also dependent of the basis weight of the mat, and because the basis weight can vary between the mats, it is preferable to use the previously defined tensile index in order to compare the strength of the various mats.

When comparing the mat facers F1 and F2, respectively with F3, F4 and F6, it is clear the benefit of using glass fibres having smaller diameter in order to get increased tensile strength. Indeed, it is meaningful to compare these facers and the effect of the inner ply composition because they all have the same slurry composition.

The screen configuration may also have an effect on the strength of the mat (mat F1 is stronger than mat F2 with respectively a tensile index of 54.2 and 50.8) and thus, it is important to compare mats with same screen configuration.

Table 5 clearly shows when comparing F1 with F3 and F4 that the use of glass fibres of average dimension of 11 and/or 16 micrometres in the inner ply leads to mats with stronger tensile index than when fibres with an average dimension of 23 micrometres. Similarly, same conclusion can be made when comparing F2 with F6.

Possibly, the benefit of using glass fibres having smaller diameter to form the inner ply of the mats is due to the increase surface area of the smaller glass fibres: the surface ratio of glass fibres having an average size of 11 micrometres over glass fibres having an average size of 23 micrometres is about 2. This may lead to a proportionally increased surface of the glass fibres to be covered by the binder composition. Therefore, there is a clear advantage on using glass fibres having 11 micrometres diameter when it is desired to obtain a mat facer with a higher tensile strength, or a mat facer with similar tensile strength but reduced with basis weight, thus lighter.

Another key mat facer property for wet area plasterboard applications is the water barrier property. Comparative mat facers F1, F2, F3, F4 and F6 are examples of common mat facers for wet area plasterboard made with the same reference slurry composition. These facers show low cobb 60 values, i.e. below 12 $g/m^2$, low cobb 2H values, i.e. below 40 $g/m^2$, preferably below 30 $g/m^2$, and low water permeability 2H values, i.e. below 60 $g/m^2$, which correspond to the desired application requirements for wet area plasterboards.

In these comparative mat facers, the required water barrier properties are achieved thanks to the addition of a water repellent agent in the slurry as additive. In particular, the water repellent agent used as additive was a fluorocarbon agent, especially a perfluoroacrylate copolymer dispersion. However, the presence of such fluorocarbon additive can have the drawback to negatively impact the adhesion between the facer and the gypsum core (see Example 7 and table 9). The following comparison is based on non-embossed facers. F1 has lower ambient peeling value than F5, and F1 and F3 show lower humid peeling values than F10. Inventive mat facers F7 to F11, based on the inventive binder composition B2, B3 and B4, present good water barrier properties (Cobb 2H<28 $g/m^2$; water absorption 2H<60 $g/m^2$) without the need of adding fluorocarbon a water repellent agent. This is clearly showing the benefit of the inventive binder composition for achieving the required barrier properties.

Example 4: Preparation of Mini-Boards

Mini-boards were prepared for the purpose of conducting drying tests and to evaluate the role of some factors, namely the roughness, the fibre size and the binder composition on the drying step of the plasterboard production. Thus, 4 mini-boards were prepared MB1, MB2, MB10 and MB11: 2 comparative mini-boards MB1 and MB2 respectively on basis of comparative mat facers F1 and F2 with the features previously described, and 2 inventive mini-boards MB10 and MB11 respectively on basis of inventive mat facers F10 and F11 with the features also described previously. The results are presented in Table 6.

Mini boards have been prepared in a laboratory at 23° C. 50% RH with a size of 320×320 mm. The mats were cut and folded at 3 edges, so as to prepare a kind of envelop for wrapping the gypsum core on both sides and edges in a single operation. This mat envelop was placed into a vertical metallic mould with the open part of the envelop laid on the top of the mould. The powder additives were weighted and mixed together. The gauging water and the liquid additives were then mixed, and then the foam was prepared separately and added to the liquid mixture. The powder mixture was then poured into the liquid preparation, and then mixed again to obtain an homogeneous slurry without lumps. The gypsum slurry was then immediately poured into the mat envelop, and the mould was pressed so as to calibrate the board specimen at 12.5 mm. The slurry in excess was removed at the top of the mould.

After gypsum has set for at least 5 minutes, the mould was open and the specimen was gently removed. It was then placed in a drier which is piloted so as to get a similar drying profile as in industrial drier zones. In the last period of drying, the air temperature was progressively reduced down to 90° C. in order to finely tune the remaining moisture in the board down to a value of less than 1%.

TABLE 6

Drying time of mini-boards

| Mini-board | Drying time (min) |
|---|---|
| MB1(non embossed) Comparative | 115 |
| MB2 (embossed) Comparative | 100 |
| MB10 (non embossed) Inventive | 85 |
| MB11 (embossed) Inventive | 85 |

Comparative mini-boards MB1 and MB2 were prepared with glass fibres having an average particle diameter of 23 μm and comparative slurry composition S1 whereas inventive mini-boards MB10 and MB11 were prepared with glass fibres having an average particle diameter of 11 μm and inventive slurry composition S5.

Table 6 shows that the drying time of the specimens MB10 and MB11 is shorter than the one of MB1 and MB2. Moreover, there are no blisters on the boards. This advantage comes from the mat F10 and F11 having a higher air porosity than F1 and F2, which allows the vapour to go quicker through the mat during the drying operation. In the industrial process, this advantage will results in an increase of the line speed without the risk of blowing the mats.

Example 5: Preparation of Plasterboards

The line that was used for the manufacture of the plasterboards was a standard line. The composition of the slurry of the core was a standard formulation for wet area boards, except for F5 which was not hydrofugated, and was the same as the composition of the core of the boards marketed by company SINIAT for the commercial product PREGYWAB, which is according to US 2006/0068186. Each board was laminated between 2 sheets of mats. The facers that were used for the manufacture of the plasterboards according to the invention were facers F10 and F11. At the end of the line, boards were cut and then introduced in a long drier so as to extract the water in excess. The drying profile is finely tuned along the zones of the drier, so as to obtain a migration of bonding additives towards the interfaces with the mats and to achieve a moisture of less than 1%. The boards thus obtained have been subjected to the tests below.

Example 6: Flexural Strength (MD) Measurements

The flexural strength of boards was measured according to EN520 § 5.7 and EN 15 283-1. § 5.6. Samples having 400×300 mm were cut off the boards prepared as above in the machine direction (MD) and were subjected to a load, which is increased at a controlled rate until failure occurs.

The samples were then conditioned according to 2 modes:
Dry: specimens are dried to constant mass at a temperature of 40±2° C. The test was performed within 10 min of removal from the drying oven.
Humid: the samples were placed in a humid chamber at a temperature of 30° C. and 90% RH for a period of 7 days. The test was performed within 10 min of removal of the humid chamber.

Each sample was then placed into the loading machine with the face down on two parallel supports rounded to a radius between 3 mm and 15 mm, with the centres 350±1 mm apart.

The load was applied at a rate of 250±125 N/min at the centre±2 mm of the span parallel to the supports by means of a plate with a rounding radius between 3 mm and 15 mm. Each failure value was recorded to the nearest 1 Newton.

The flexural strength measurements were based on industrial trials and average of quality control for regular productions. The comparison between the basis weight and tensile strength of the mat, and the flexural breaking load of the relevant board is given in Table 7.

TABLE 7

Tensile strength and flexural breaking load of the mat

| Features | Unit | F1 | F2 | F3 | F5 | F10 | F11 |
|---|---|---|---|---|---|---|---|
| Grammage of the mat | g/m$^2$ | 158 | 158 | 148 | 122 | 120 | 120 |
| MD tensile strength of the mat | N/m | 12487 | 11582 | 13018 | 15060 | 14095 | 13557 |
| Dry MD Flexural strength of board | N | 730 | 710 | 720 | 750 | 590 (9.5 mm board) | 790 |
| Humid MD Flexural strength of the board | N | 530 | 510 | 550 | Not relevant (*) | 530 (9.5 mm board) | 700 |
| Dry Flexural index (breaking load/grammage) | N/g/m$^2$ | 4.6 | 4.5 | 4.9 | 6.15 | 4.9 | 6.6 |
| Humid Flexural index (breaking load/grammage) | N/g/m$^2$ | 3.4 | 3.2 | 3.7 | na | 4.4 | 5.8 |

(*) As this board is not designed for wet area applications, the humid values are not available All boards were of 12.5 mm except for F10 example, which is based on 9.5 mm board. In order to get a better comparative view, the figures are also expressed in breaking stress, which takes into account the thickness of the board (via the modulus of inertia).

TABLE 8

Flexual strength and breaking stress of the boards

| Features | Unit | F1 | F2 | F3 | F5 | F10 | F11 |
|---|---|---|---|---|---|---|---|
| Grammage of the mat | g/m$^2$ | 158 | 158 | 148 | 122 | 120 | 120 |
| MD tensile strength of the mat | N/m | 12487 | 11582 | 13018 | 15060 | 14095 | 13557 |
| Dry MD Flexural stress of board | N/mm$^2$ | 8.2 | 8.0 | 8.1 | 8.3 | 11.4 (9.5 mm board) | 8.8 |
| Humid MD Flexural stress of the board | N/mm$^2$ | 5.9 | 5.7 | 6.2 | NA (*) | 10.3 (9.5 mm board) | 7.8 |

TABLE 8-continued

Flexual strength and breaking stress of the boards

| Features | Unit | F1 | F2 | F3 | F5 | F10 | F11 |
|---|---|---|---|---|---|---|---|
| Dry Stress index (flexural stress/grammage) | $(N/mm^2)/(g/m^2)$ | 0.052 | 0.051 | 0.055 | 0.068 | 0.095 | 0.073 |
| Dry Stress index (flexural stress/grammage) | $(N/mm^2)/(g/m^2)$ | 0.037 | 0.036 | 0.042 | NA (*) | 0.085 | 0.065 |

(*) As this board is not designed for wet area applications, the humid values are not available (NA) and also not relevant These 2 tables highlight the gain of flexural strength on boards with improved mat according to the invention (F10-F11): about +10% in dry conditions and about +20% in humid conditions. The tendency is also visible on F3 and F5, which are relevant to a composition that is intermediate between F1-F2 and F10-F11. But if we compared the inventive mat F10 to the reference mat F3 and F5, where the fibrous composition is comparable, these results are thus showing the benefit of the inventive binder composition on the flexural strengths of the boards.

Moreover, the gain is achieved with a mat that is about 25% lighter than the comparative ones (F1 and F2).

In order to better represent the efficiency of the board according to the invention, a flexural index and a stress index were calculated. It represents the mechanical flexural performance divided by the basis weight of the mat. According to these indexes, the benefits of boards F10 and F11 are even magnified.

Example 7: Bonding Between Gypsum Core and the Mat

The bonding strength between the gypsum core and the mat was measured by a peeling test as defined here after. The test method consists in measuring the load necessary to pull off the liners from the core over a 50 mm length, perpendicularly to the surface. Depending on the resistance of the liner and the crystallization at the core/liner interface, the failure mode can be a peeling (de-bonding) at the core/liner interface or an internal delamination of the liner, or tear rupture of the liner.

The basic peeling test machine is composed of:
A metal rig with a feeding bucket containing glass beads
Bearings to support the specimen
A device to start the feeding of glass beads into a bucket that is gripped and hung at specimen ends
An automatic stop of the feeding when test is terminated: the failure is recorded with a accuracy of 1 g.

The specimens are then conditioned according to 2 modes:
Ambient conditions: specimens were stabilized 2 days at 23° C. 50% RH
Humid: the specimens were placed in a humid chamber at 30° C. 90% RH for a period of 24 hours. The test was performed within 5 min of removal of the humid chamber

TABLE 9

Bonding strength between the gypsum core and the mats

| Features | Unit | F1 | F2 | F3 | F5 | F10 | F11 |
|---|---|---|---|---|---|---|---|
| Grammage of the mat | $g/m^2$ | 158 | 158 | 148 | 122 | 120 | 120 |
| Ambient peeling force | g | 1850 | >2200 | 1430 | ≥2000 | 1710 | 2100 |
| Humid peeling force | g | 1000 | 1890 | 910 | NA (*) | 1240 | 1670 |

(*) As this board is not designed for wet area applications, the humid values are not available (NA) and also not relevant By comparing the results obtained with mat F3 with mat F1, we can observe that the use of smaller glass fibre diameter (respectively 11 μm and 23 μm) is leading to lower adhesion with the gypsum core, both in ambient and humid conditions.

By further comparing the results got on mat F3 and the inventive mat F10, which both have comparable fibre composition, we can see the benefit of the inventive binder composition on the both the ambient and humid adhesion to the gypsum core. We can also draw a similar conclusion by comparing the results from mat F2 and inventive mat F11 (we also in the meantime, observe the benefit of the double screen process on the bond improvement).

Although F10-F11 boards were made with lighter and thinner mats, the peeling values were still maintained at a good level, which guarantees a high cohesion of the board and therefore a strong substrate for finishing with bonded products (link with System—example 9). For comparison, comparative glass mat boards were found to have peeling values of about 1000 g in ambient conditions and 900 g in humid conditions.

On the non-embossed mat (F1 and F10), it is clear that the inventive binder composition has a positive influence regarding the humid peeling values.

Example 8: Hydrophobic Properties of Boards

The hydrophobic properties of the boards were measured by 2 tests: surface water absorption and total water absorption (immersion) according to EN 520 § 5.9 and EN 15 283-1 § 5.9.

TABLE 10

Hydrophobic properties of the boards

| Features | Unit | F1 | F2 | F10 | F11 |
|---|---|---|---|---|---|
| Grammage of the mat | $g/m^2$ | 158 | 158 | 120 | 120 |
| Surface water absorption at 2 hours | $g/m^2$ | 56 | 60 | 70 | 70 |
| Total water absorption (water uptake after 2 hours immersion) | % | 2.05 | 2.25 | NA | 1.95 |

In spite of lighter and thinner mat, boards according to the invention F10 and F11 have similar hydrophobic performances as the comparative boards F1 and F2. Once again, these results show the good advantage of the inventive binder composition to achieve the required barrier properties of the plasterboard.

Example 9: Adherence of Adhesives on Boards F11

The adherence of adhesives on boards was evaluated by 2 types of adhesive products.

The case of WAB Joint compound is representative of the finishing of boards in internal wet rooms. The joints between board edges are treated with a joint compound reinforced with a joint tape to prevent the joints from cracking. The joint compound must have good adhesive properties on the board both in ambient and humid conditions in order to achieve a consistent performance on systems, both on partitions and ceilings in wet areas.

The case of EIFS adhesive is representative of the finishing of exterior walls with external insulation systems. The insulation panels are glued onto the sheathing boards by the means of adhesives applied either by ribbons, dabs, or on the whole surface of the panels. Both the supporting board and the adhesive must withstand severe constraints, such as wind pressure and climatic variations.

TABLE 11

Adherence of adhesives on the boards

| Conditioning mode | Unit | WAB Joint compound | Adhesive for external insulation (EIFS) |
|---|---|---|---|
| Ambient: 23° C. 50% RH | N/mm2 | 0.39 | 0.56 |
| Humid: 7 days at 30° C. 90% RH | N/mm2 | 0.37 | 0.49 |
| Failure mode | | De-bonding of compound and de-cohesion of gypsum core | De-bonding of adhesive and de-cohesion of gypsum core |

Boards according to the invention have much stronger internal cohesion than those made with prior art glass mats: 16 to 19 psi=0.11 to 0.13 N/mm2 in U.S. Pat. No. 7,932,195.

Boards according to the invention have also stronger internal cohesion than those also known in the prior art with standard glass mats: about 0.20 to 0.25 N/mm2 with a cohesive failure in the glass mat.

The invention claimed is:

1. A fibrous mat for a gypsum board comprising at least one ply of a non-woven fabric and a binder composition impregnated therein, wherein:
   said binder composition represents from 10 to 40 wt % of the total weight of the mat;
   said binder composition comprises a copolymer comprising a co-monomer unit of a vinyl ester of an alpha branched aliphatic monocarboxylic acid and an acrylic co-monomer, wherein the co-monomer unit of a vinyl ester of an alpha branched aliphatic monocarboxylic acid is present in an amount of 40 to 70 wt % of the copolymer and the acrylic co-monomer is present in an amount of 34 to 60 wt % of the copolymer; and
   said copolymer being present in an amount from 50 to 100 wt % of the binder composition weight;
   wherein the fibrous mat is a facer of the gypsum board.

2. The fibrous mat according to claim 1, wherein said copolymer of the binder composition is a copolymer obtained from the co-monomer unit of a vinyl ester of an alpha branched aliphatic monocarboxylic acid and the acrylic co-monomer which is an acrylate monomer.

3. The fibrous mat according to claim 1, wherein said alpha branched aliphatic monocarboxylic acid comprises a chain length from 5 to 20 carbon atoms.

4. The fibrous mat according to claim 1, wherein:
   said binder composition represents from 20 to 30 wt % of the total weight of the fibrous mat; and
   said copolymer of the binder composition is present in the binder composition in an amount from 50 to 60 wt % of the binder composition weight; and
   said copolymer comprises the co-monomer unit of a vinyl ester of alpha branched aliphatic monocarboxylic acid having a chain length from 7 to 15 carbon atoms in an amount ranging from 40 to 50 wt % of said copolymer weight.

5. The fibrous mat according to claim 1, wherein the binder composition is free or substantially free of fluorocarbons and/or formaldehydes.

6. The fibrous mat according to claim 1, wherein:
   said binder composition represents from 20 to 30 wt % of the total weight of the fibrous mat; and
   wherein the binder composition comprises a mixture of a copolymer comprising said co-monomer unit of a vinyl ester of an alpha branched aliphatic monocarboxylic acid in an amount from 40 to 60 wt % of the binder composition weight, and of an acrylic self-cross-linkable copolymer in an amount from 60 to 40 wt % of the binder composition weight.

7. The fibrous mat according to claim 1, wherein the binder composition further comprises one or more additives selected from the group consisting of mineral filler particles, water resistant agents, water repellent agents, biocides, fire resistant agents, and pigments.

8. The fibrous mat according to claim 1, wherein the binder composition further comprises additives and is free or substantially free of a mineral filler.

9. The fibrous mat according to claim 1, wherein said non-woven fabric comprises fibres selected from the group consisting of:
   mineral fibres selected from the group consisting of glass fibres and basalt fibres;
   synthetic polymeric fibres selected from the group consisting of polyamide fibres, polyaramide fibres, polyethylene fibres, polypropylene fibres, polyester fibres; and
   organic fibres which are cellulose based fibres selected from the group consisting of flax, wood pulp, cotton fibres, sisal, abaca, viscose, rayon, and lyocell;
   wherein said cellulose based fibres represent more than 25 wt % of the weight of the non-woven fabric.

10. The fibrous mat according to claim 9, wherein said non-woven fabric is free or substantially free of polyester fibres.

11. The fibrous mat according to claim 9, wherein said non-woven fabric comprises fibres selected from the mineral fibres and the organic fibres, and wherein the amount of organic fibres varies from 40 to 100 wt % of the total weight of the fibres.

12. The fibrous mat according to claim 9, wherein said cellulose based fibres comprise fibres of soft wood origin and fibres of hard wood origin, and wherein said fibres of soft wood origin represent from 25 to 85 wt % of the total weight of the cellulose based fibres.

13. The fibrous mat according to claim 9, the fibres of said non-woven fabric consisting of the glass fibres and the cellulosic based fibres.

14. The fibrous mat according to claim 9, wherein said mineral fibres have an average diameter of from 2 to 11 μm.

15. The fibrous mat according to claim 1, wherein said non-woven fabric comprises a mixture of cellulose based fibres and glass fibres:
   said glass fibres comprise glass fibers having an average diameter from 10 to 15 μm; and
   said cellulose based fibres being present in the mixture in an amount from 40 to 85 wt % of the total weight of the fibres.

16. The fibrous mat according to claim 1, wherein said fibrous mat has two sides, an inner side that is intended to contact a gypsum core, and an outer side that is intended to face away from the gypsum core, wherein an embossing pattern is formed at least on one side of the fibrous mat.

17. The fibrous mat according to claim 16, said fibrous mat comprising a surface roughness Sa in at least one of said two sides, said surface roughness Sa being less than 60 μm.

18. The fibrous mat according to claim 16, wherein the inner side and the outer side each comprise a surface roughness, and wherein the inner side comprises a surface roughness in a range of 10 to 40 μm and the outer side comprises surface roughness is less than 12 μm.

19. The fibrous mat according to claim 1, wherein said mat comprises two plies of a non-woven fabric, one of said two plies being an inner ply intended to contact a gypsum core, and an outer ply intended to face away from said gypsum core; wherein the composition of the inner ply is different from the composition of the outer ply.

20. The fibrous mat according to claim 19, wherein the inner ply comprises a mixture of organic fibres and mineral fibres and said fibres are present in the mixture in a ratio from 50 to 60% of organic fibres to 40 to 50% of mineral fibres; and/or the outer ply comprises more than 90% of organic fibres.

21. The fibrous mat according to claim 1, wherein the total basis weight of the fibrous mat is from 80 to 160 g/m$^2$.

22. The fibrous mat according to claim 19, wherein based on the final weight of the fibrous mat, the inner ply represents from about 30 to about 120 g/m$^2$, the outer ply represents from about 10 to about 70 g/m$^2$, and the binder composition represents from about 20 to about 60 g/m$^2$.

23. A process to produce a fibrous mat comprising impregnating at least one ply of a non-woven fabric with an aqueous dispersion or solution of the binder composition according to claim 1.

24. The process according to claim 23, comprising:
   forming said non-woven fabric on at least one screen from a suspension of fibres;
   drying said non-woven fabric, thereby obtaining a dried web; and
   impregnating said web with said binder via a wet-laid process.

25. A gypsum board comprising a gypsum core with at least one side covered by the fibrous mat according to claim 1; wherein the gypsum board further comprises a water resistant agent, fire resistant agent, a mineral filler, a biocide and/or a pigment in said gypsum core and/or in said non-woven fabric of said fibrous mat.

26. The gypsum board according to claim 25, wherein the gypsum core comprises:
   at least a water-resistant additive, in an amount sufficient such that the core absorbs less than about 10% water when tested in accordance with ASTM method C-473 and/or in accordance with EN 520 method section 5.9.2,
   at least a fire-resistant additive in an amount sufficient such that the board achieves an ASTM E-119 and/or C36-95 fire rating of at least about one hour, and/or
   set hydratable calcium sulphate, obtained from a hydratable calcium sulphate having a particle size distribution such that, after splitting in water:
   d10 is from 1 to 2 μm; and
   d50 is from 5 to 35 μm; and/or
   d90 is from 35 to 85 μm.

27. The gypsum board according to claim 25, said gypsum board having a Cobb 2 hours value less than 100 g/m$^2$ and a ratio Flexural strength/basis weight of the mat of at least 5.5 in ambient conditions (23° C.; 50% RH) when calculated in MD with breaking load of 660N for a 12.5 mm board and a mat weight of 120 g/m$^2$, and of at least 5 in humid conditions(30° C. 90% RH).

28. A process for producing a gypsum board according to claim 26, comprising the step of laminating a gypsum core with said fibrous mat; and further comprising a step of producing said fibrous mat by a wet-laid process.

29. A system for an interior or exterior of a building comprising the gypsum board according to claim 26.

30. The system according to claim 29, further comprising:
   an insulating material having an inner surface and an outer surface, the inner surface of which is adhered to the surface of the non-woven fabric of said gypsum board by an adhesive material and an exterior finishing material overlying the outer surface of said insulating material, optionally including a reinforcing member sandwiched between said insulating material and said finishing material; or
   an underlying structural support element which is covered with an overlying finishing material; or
   a metal or wood framework, or studs for supporting said gypsum board.

31. The fibrous mat according to claim 1, wherein the fibrous mat is capable of obtaining a Class A+ certification (<10 μg/m$^3$ formaldehyde-Indoor Air Quality).

32. The fibrous mat according to claim 1, wherein the binder composition is present in an amount of from about 20 to about 60 g/m$^2$.

33. The fibrous mat according to claim 1, wherein the fibrous mat comprises a Cobb 2 hours value of less than 40 g/m$^2$.

* * * * *